(12) United States Patent
Tanaka et al.

(10) Patent No.: US 12,523,466 B2
(45) Date of Patent: Jan. 13, 2026

(54) CALIBRATION JIG

(71) Applicant: MITUTOYO CORPORATION, Kanagawa (JP)

(72) Inventors: Ryosuke Tanaka, Oberndorf am Neckar (DE); Hikaru Shigeno, Kanagawa (JP); Yuji Sadahira, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 18/758,861

(22) Filed: Jun. 28, 2024

(65) Prior Publication Data

US 2025/0035431 A1 Jan. 30, 2025

(30) Foreign Application Priority Data

Jul. 26, 2023 (JP) ................. 2023-121634

(51) Int. Cl.
*G01B 11/25* (2006.01)
(52) U.S. Cl.
CPC ................. *G01B 11/2504* (2013.01)
(58) Field of Classification Search
CPC .... G01B 11/2504; G01B 3/30; G01B 5/0004; G01B 21/042; G01B 11/245
See application file for complete search history.

(56) References Cited

U.S. PATENT DOCUMENTS

| | | |
|---|---|---|
| 2017/0264885 A1 | 9/2017 | Haugan et al. |
| 2019/0015988 A1* | 1/2019 | Inazumi ................. B25J 9/1692 |
| 2019/0212139 A1* | 7/2019 | Allen .................... H04N 13/246 |
| 2025/0022155 A1* | 1/2025 | Sivaraman ................ G06T 7/55 |

FOREIGN PATENT DOCUMENTS

JP 2019-507885 3/2019

* cited by examiner

*Primary Examiner* — Michael E Teitelbaum
(74) *Attorney, Agent, or Firm* — Greenblum & Bernstein, P.L.C.

(57) ABSTRACT

A calibration jig that calibrates a measurement apparatus for measuring a three-dimensional geometry of a measurement target, including: a plurality of elements to be measured, a frame part to which the plurality of elements to be measured are attached, and a mechanism part that moves the frame part, wherein the mechanism part includes: a rotation mechanism that rotates the frame part about a first axis; a first swinging mechanism that swings the frame part about a second axis orthogonal to the first axis; and a second swinging mechanism that swings the frame part about a third axis orthogonal to the first axis and the second axis.

8 Claims, 14 Drawing Sheets

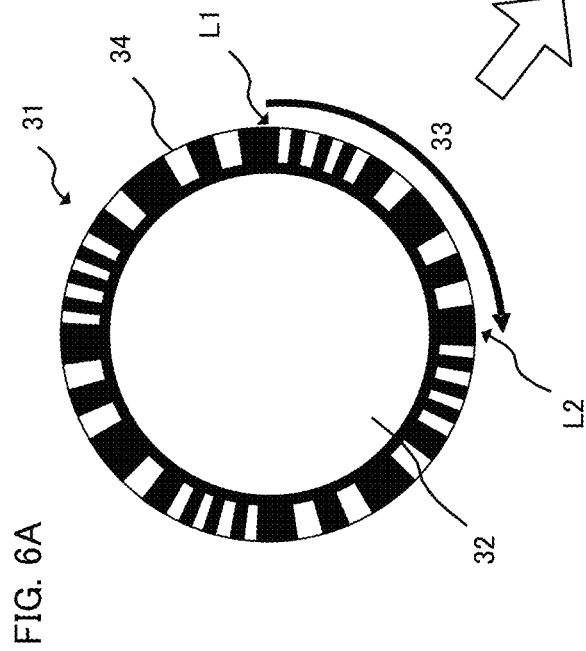
FIG. 6A
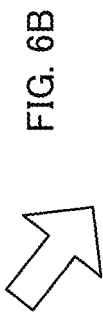
FIG. 6B
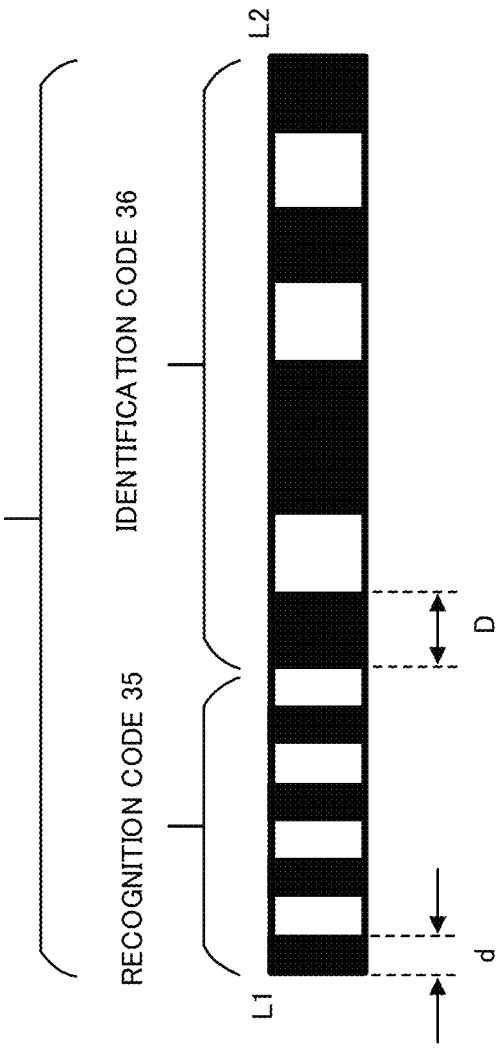

CALIBRATION JIG

CROSS-REFERENCE TO RELATED APPLICATIONS

The present application claims priority to Japanese Patent Applications number 2023-121634, filed on Jul. 26, 2023 contents of which are incorporated herein by reference in their entirety.

BACKGROUND OF THE INVENTION

A measurement apparatus that includes a plurality of imaging apparatuses and measures a three-dimensional geometry of a measurement target in a non-contact manner on the basis of a result obtained by capturing the measurement target from a plurality of directions has been known (for example, refer to Japanese Translation of PCT International Application Publication Number JP-T-2019-507885.)

In such a measurement apparatus, calibration of the apparatus has been performed by capturing the same calibration jig with the plurality of imaging apparatuses or by capturing a calibration jig having known dimensions with the plurality of imaging apparatuses.

However, with the conventional calibration jig, there was a problem in that a plurality of elements to be measured provided on the calibration jig cannot be oriented in various directions.

Further, it is desirable that complicated operation control is not needed when operating the plurality of elements to be measured.

The present disclosure focuses on these points, and its object is to provide a calibration jig that does not require complicated operation control and can orient a plurality of elements to be measured to desirable directions.

BRIEF SUMMARY OF THE INVENTION

A calibration jig according to a first aspect of the present disclosure calibrates a measurement apparatus for measuring a three-dimensional geometry of a measurement target and includes: a plurality of elements to be measured; a frame part to which the plurality of elements to be measured are attached; and a mechanism part that moves the frame part, wherein the mechanism part includes: a rotation mechanism that rotates the frame part about a first axis; a first swinging mechanism that swings the frame part about a second axis orthogonal to the first axis; and a second swinging mechanism that swings the frame part about a third axis orthogonal to the first axis and the second axis.

BRIEF DESCRIPTION OF THE DRAWINGS

FIGS. 6A and 6B each show a configuration example of an element to be measured.

DESCRIPTION OF THE PREFERRED EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention. Although the present disclosure mainly relates to a calibration jig shown in FIG. 8 to FIGS. 14A and 14B, the underlying technology regarding calibration will be described first.

Configuration Example of a Measurement System S

Figure 1:
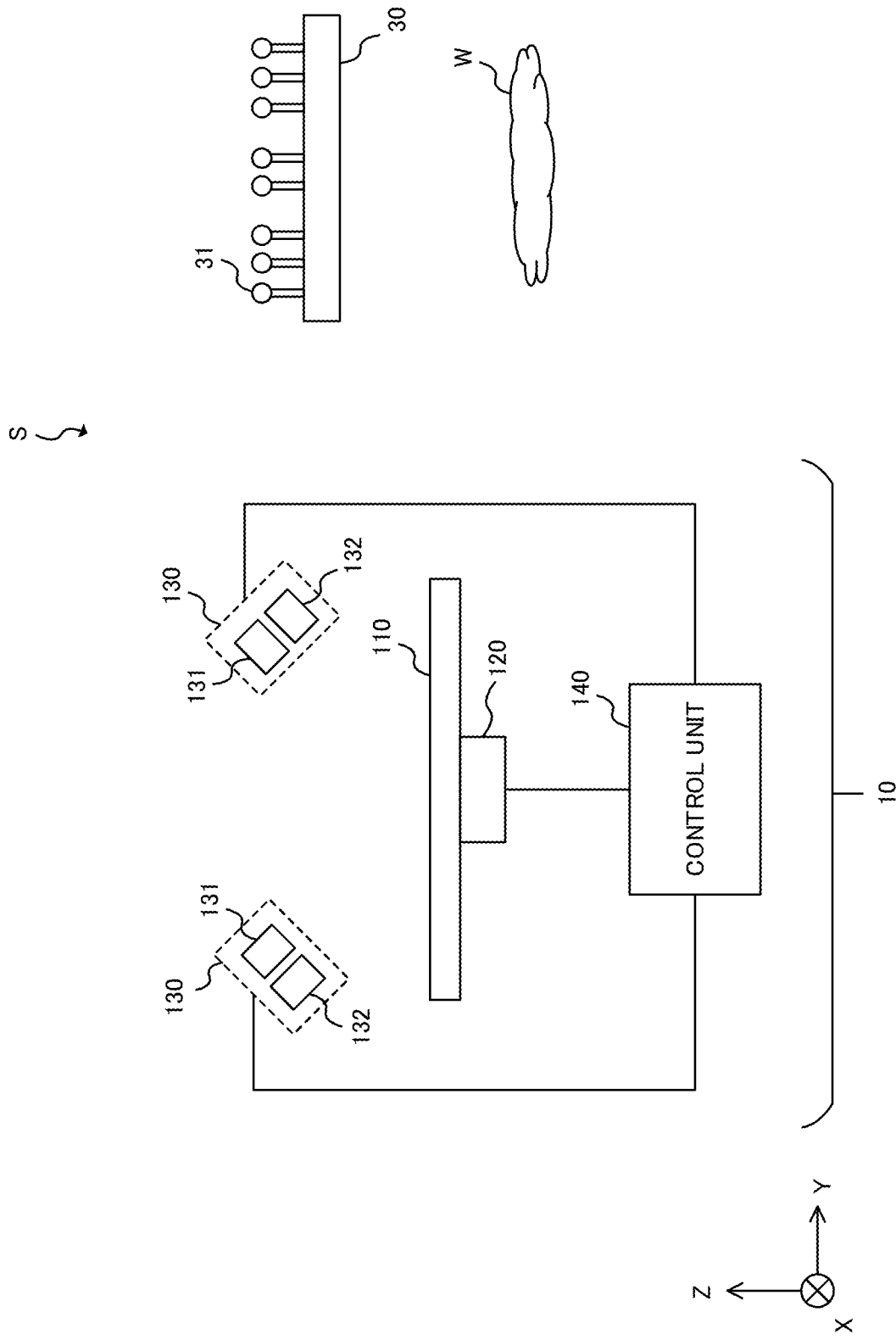
FIG. 1 shows a configuration example of a measurement system.

FIG. 1 shows a configuration example of a measurement system S according to the present embodiment. The measurement system S includes a measurement apparatus 10 and a calibration jig 30.

The measurement apparatus 10 measures a three-dimensional geometry of a measurement target W (hereinafter may be referred to as a workpiece W) by radiating light from a plurality of directions onto the measurement target W disposed in a three-dimensional space and receiving reflected light. Further, the measurement apparatus 10 radiates light from a plurality of directions onto the calibration jig 30 disposed in the three-dimensional space and identifies calibration parameters used for a calibration of the measurement apparatus 10 itself by receiving reflected light. The measurement apparatus 10 includes a stage 110, a moving part 120, an optical unit 130, and a control unit 140.

The stage 110 has the measurement target W mounted thereon. When the measurement system S performs calibration on the measurement apparatus 10, the stage 110 has the calibration jig 30 mounted thereon. The stage 110 is configured to be movable in a plurality of predetermined directions. In the present embodiment, an example in which the stage 110 is configured to be movable in a first direction and a second direction different from the first direction will be described. The first direction and the second direction are orthogonal, for example.

For example, the stage 110 has a function of an XY stage that is movable in an X-direction and a Y-direction in an XY plane. In this case, a first direction is the X-direction or the Y-direction, and a second direction is the Y-direction or the X-direction.

The stage 110 is configured to be rotatable about axes oriented in a plurality of predetermined directions. In the present embodiment, an example in which the stage 110 is configured to be respectively rotatable about axes oriented in a third direction and a fourth direction different from the third direction will be described. The third direction and the fourth direction are orthogonal, for example. Here, the first direction and the third direction may coincide with each other, or the second direction and the fourth direction may coincide with each other.

For example, the stage 110 has a function of a rotation stage rotatable about an axis oriented in the X-direction and a function of a rotation stage rotatable about an axis oriented in the Y-direction. In this case, the third direction is the X-direction or the Y-direction, and the fourth direction is the Y-direction or the X-direction. The measurement apparatus 10 needs to be configured so that the calibration jig 30 can be moved, and a movable arm or the like that can move while fixing the calibration jig 30 may be provided instead of the stage 110.

The moving part 120 moves the stage 110. In other words, the moving part 120 moves the measurement target W when the stage 110 has the measurement target W mounted thereon. When the stage 110 has the calibration jig 30 mounted thereon, the moving part 120 moves the calibration jig 30. The moving part 120 includes an actuator such as a motor, and moves the stage 110 in the first direction or the second direction. Further, the moving part 120 rotates the stage 110 about the axis oriented in the third direction. Similarly, the moving part 120 rotates the stage 110 about the axis oriented in the fourth direction.

The optical unit 130 includes a light source 131 and an imaging part 132. The light source 131 radiates light onto the measurement target W. The light source 131 includes at least one of a halogen lamp, LED, laser beam, or the like. The light source 131 is a projector that radiates light with a predetermined pattern, for example. The light emitted from the light source 131 is reflected by the measurement target W. The imaging part 132 captures the measurement target W when reflected light from the measurement target W is incident on the imaging part 132. The imaging part 132 includes a camera capable of capturing a still image, video, and the like. The imaging part 132 may include a plurality of cameras.

A plurality of the optical units 130 are provided at different positions of the measurement apparatus 10. In other words, a plurality of light sources 131 radiate light onto different regions of the measurement target W, and a plurality of imaging parts 132 respectively capture a plurality of different regions of the measurement target W. The imaging parts 132 of the plurality of optical units 130 respectively capture different portions of the measurement target W, for example. In this case, it is desirable that the plurality of optical units 130 are disposed so that the overall configuration of the measurement target W can be grasped by combining a plurality of capturing results obtained by the plurality of imaging parts 132. An example in which two optical units 130 are disposed is described in the present embodiment for the sake of simplicity, but the present disclosure is not limited thereto. Three or more optical units 130 may be disposed.

The control unit 140 controls the moving part 120 and the optical units 130. When the stage 110 has the measurement target W mounted thereon, the control unit 140 acquires capturing results of the measurement target W taken by the imaging parts 132 from the optical units 130, and measures the three-dimensional geometry of the measurement target W on the basis of the acquired capturing results. When the stage 110 has the calibration jig 30 mounted thereon, the control unit 140 acquires capturing results of the calibration jig 30 taken by the imaging parts 132 from the optical units 130, and identifies the calibration parameters to be used for the calibration of the measurement apparatus 10 on the basis of the acquired capturing results. The control unit 140 will be described later.

The calibration jig 30 includes a plurality of elements to be measured 31 having a predetermined shape, and is a jig for calibrating the measurement apparatus 10. In the present embodiment, an example is described where the calibration jig 30 includes the elements to be measured 31 on its upper surface. When the calibration jig 30 is mounted on the stage 110, it is desirable that the plurality of elements to be measured 31 are provided such that the plurality of elements to be measured 31 are included in the field of view of the imaging part 132 included in one optical unit 130.

Figure 2:
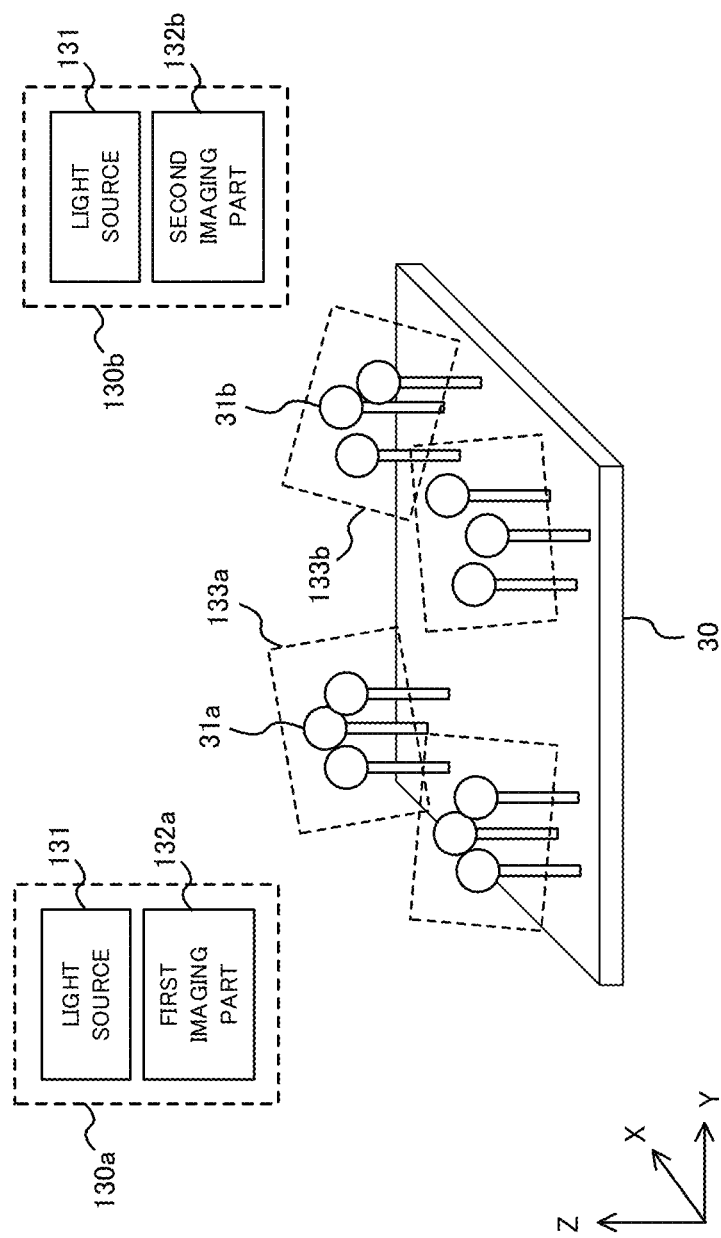
FIG. 2 shows an example in which a measurement apparatus has the calibration jig mounted thereon.

FIG. 2 shows an example in which the measurement apparatus 10 according to the present embodiment has the calibration jig 30 mounted thereon.

FIG. 2 shows an example in which a first element to be measured 31a is in a field of view 133a of a first imaging part 132a of a first optical unit 130a, and a second element to be measured 31b is in a field of view 133b of a second imaging part 132b of a second optical unit 130b.

In the present embodiment, an example is shown in which different elements to be measured 31 are included in the field of view 133a of the first imaging part 132a and the field of view 133b of the second imaging part 132b, but the present embodiment is not limited thereto. For example, a part or the entirety of the first element to be measured 31a may be in the field of view 133a of the first imaging part 132a, and a part or the entirety of the first element to be measured 31a may be in the field of view 133b of the second imaging part 132b.

Each optical unit 130 can capture the element to be measured 31 in its field of view by radiating the light from the light source 131 onto the calibration jig 30 and capturing an image with the imaging part 132. Then, the control unit 140 acquires the capturing results from the imaging parts 132 and measures the three-dimensional geometry of the element to be measured 31. The element to be measured 31 has a predetermined size and a predetermined shape. The element to be measured 31 may be formed to have predetermined dimensions. The element to be measured 31 may have different shapes, marks, colors, and the like. In the present embodiment, an example will be described in which the element to be measured 31 takes a shape of a ball and the control unit 140 measures the center position of the ball.

Here, the dimensions and positional relationship of the plurality of elements to be measured 31 provided in the calibration jig 30 may be known in advance. In this case, the control unit 140 can calibrate the measurement apparatus 10 by comparing (i) the known dimensions and positional relationship of the elements to be measured 31 and (ii) a measurement result of the three-dimensional geometry of the element to be measured 31. For example, the control unit 140 identifies coefficients or the like to be multiplied by the measurement result of the three-dimensional geometry as the calibration parameters so that the measurement result of the three-dimensional geometry of the element to be measured 31 matches the dimensions and positional relationship of the elements to be measured 31.

However, in the case of the measurement apparatus 10 for measuring a large measurement target, the calibration jig 30 also becomes large, and it was sometimes difficult to measure precise dimensions. Also, in the case of the measurement apparatus 10 for measuring a complicated measurement target, the shape, disposition, and the like of the calibration jig 30 become complicated, and it was sometimes difficult to measure precise dimensions.

On the other hand, even if the dimensions of such a calibration jig 30 can be measured, the dimensions may be varied due to environmental changes or the like, or impact may cause dimensional deviation or the like, and therefore it was difficult to easily calibrate the measurement apparatus 10. Therefore, a measurement system S according to the present embodiment makes it possible to calibrate such a measurement apparatus 10 even with a calibration jig 30 having a plurality of elements to be measured 31 whose dimensions and positional relationship are not known. The control unit 140 of said measurement apparatus 10 will now be described.

<Configuration Example of the Control Unit 140>

Figure 3:
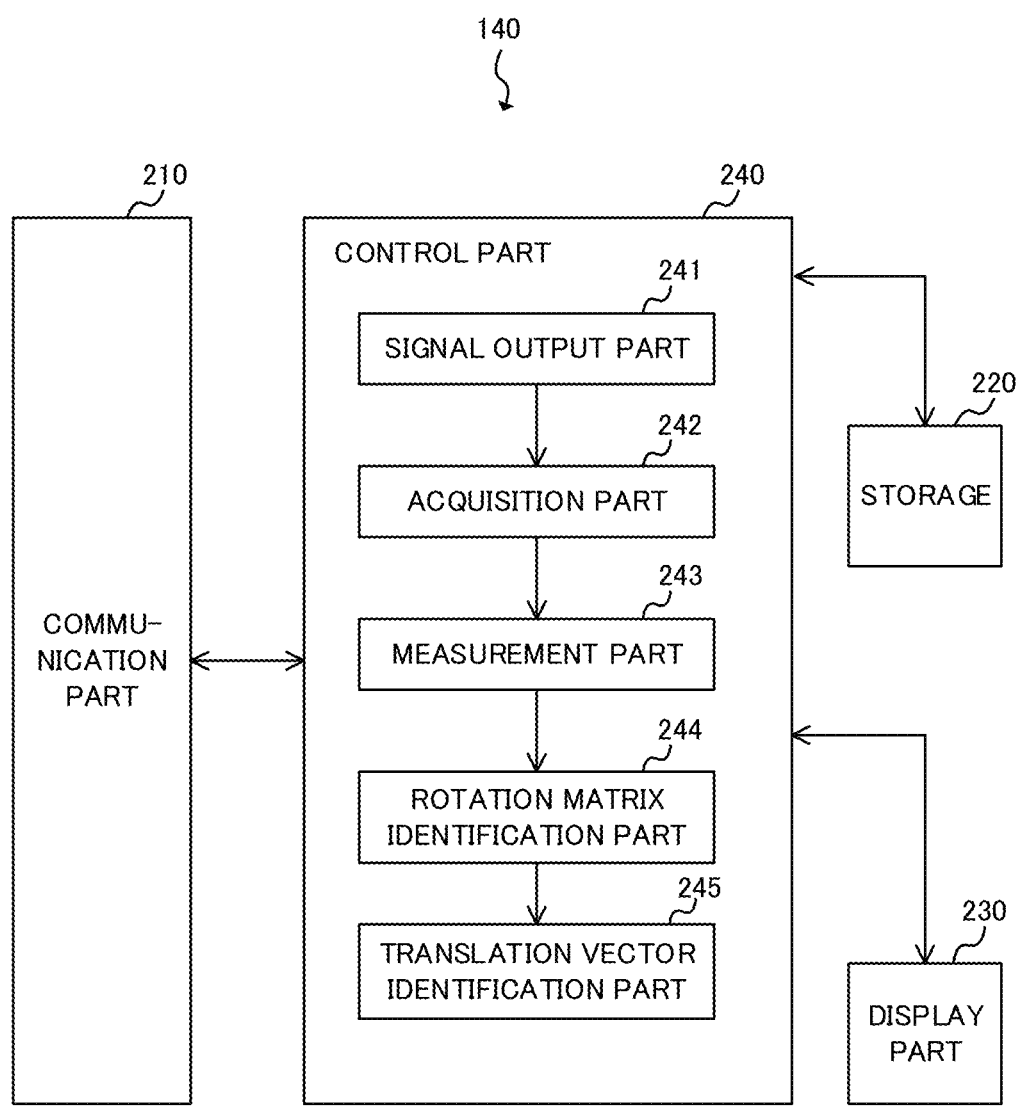
FIG. 3 shows a configuration example of a control unit.

FIG. 3 shows a configuration example of the control unit 140 according to the present embodiment. The control unit 140 is a computer, for example. The control unit 140 includes a communication part 210, a storage 220, a display part 230, and a control part 240.

The communication part 210 communicates with the moving part 120 and the optical unit 130. The communication part 210 transmits a control signal for moving the measurement target W or the calibration jig 30 to the moving part 120, for example. The communication part 210 may transmit a control signal for controlling the light source 131 and the imaging part 132 to the optical unit 130. The communication part 210 may receive the capturing result of the imaging part 132 from the optical unit 130.

The communication part 210 communicates via a dedicated connection line, a communication network, and the like. The communication part 210 may function as an interface for connecting to the communication network such as an Internet line, a wireless LAN, or a mobile phone network.

The storage 220 includes a storage medium such as a ROM (Read Only Memory), a RAM (Random Access Memory), or the like, for example. The storage 220 may include a large-capacity storage device like a hard disk drive (HDD) and/or a solid state drive (SSD). For example, when the computer functions as the control unit 140, the storage 220 may store an OS (Operating System) that causes the computer to function, and information such as a program. The storage 220 may store various types of information including data to be referred to at the time of executing the program.

The storage 220 may store intermediate data, calculation results, thresholds, reference values, parameters, and the like, which are generated (or used) in an operation process of the control unit 140. Further, in response to a request from each part of the control unit 140, the storage 220 may provide the stored data to a request source.

The display part 230 displays information about measurement of the measurement apparatus 10. The display part 230 displays information such as measurement conditions, measurement items, and measurement results. The display part 230 may display a communication state of the control unit 140, an OS, an execution state of applications, and the like. The display part 230 is a display such as a liquid crystal display or a monitor, for example.

The control part 240 controls each part of the measurement apparatus 10. For example, the control part 240 transmits and receives various types of information via the communication part 210. The control part 240 is a CPU (Central Processing Unit), for example. The control part 240 controls the moving part 120 and the imaging parts 132 to measure the three-dimensional geometry of the measurement target W on the basis of the capturing results of the plurality of imaging parts 132.

The control part 240 includes a signal output part 241, an acquisition part 242, a measurement part 243, a rotation matrix identification part 244, and a translation vector identification part 245. In other words, the CPU functions as the control part 240 including the signal output part 241, the acquisition part 242, the measurement part 243, the rotation matrix identification part 244, and the translation vector identification part 245 by executing the program stored in the storage 220.

The signal output part 241 outputs a control signal for controlling each part of the measurement apparatus 10 to the communication part 210. The signal output part 241 outputs a control signal for controlling the light source 131 and the imaging part 132 of the optical unit 130, for example. As an example, the signal output part 241 outputs a control signal for causing the light source 131 of one optical unit 130 to emit light in a predetermined pattern and a control signal for causing the imaging part 132 of one optical unit 130 to capture an image. By doing this, the communication part 210 transmits the control signals to the one optical unit 130, and the one optical unit 130 captures an image of an object (e.g., the element to be measured 31) in its field of view.

The signal output part 241 outputs a control signal for driving the moving part 120. The signal output part 241 may output a control signal for causing the display part 230 to display information or the like. The signal output part 241 may generate a control signal corresponding to an operation purpose or may output a control signal with a predetermined signal pattern. The signal pattern of the control signal may be stored in the storage 220.

The acquisition part 242 acquires data of the captured image captured by the imaging part 132 of the optical unit 130 as the capturing result. The acquisition part 242 may store the acquired capturing result of the imaging part 132 in the storage 220. The acquisition part 242 may also acquire information about the current position of the stage 110.

The measurement part 243 measures the three-dimensional geometry of the measurement target W or the calibration jig 30 on the basis of the capturing result of the imaging part 132 acquired by the acquisition part 242. The measurement part 243 measures a length of a predetermined portion, dimensions of a predetermined shape, and the like of the measurement target W, for example. By using the capturing results of the plurality of imaging parts 132, the measurement part 243 can also measure the length and shape of a predetermined portion of the measurement target W which cannot fit in the field of view of one imaging part 132. Since the operation in which the measurement part 243 measures the three-dimensional geometry of the measurement target W from the capturing results of the plurality of imaging parts 132 is well known, a detailed description thereof is omitted here.

The rotation matrix identification part 244 identifies a rotation matrix used for the calibration of the measurement apparatus 10. The translation vector identification part 245 identifies a translation vector used for the calibration of the measurement apparatus 10. The operations of the rotation matrix identification part 244 and the translation vector identification part 245 will be described below.

Example of an Operation Flow of the Measurement Apparatus 10

Figure 4:
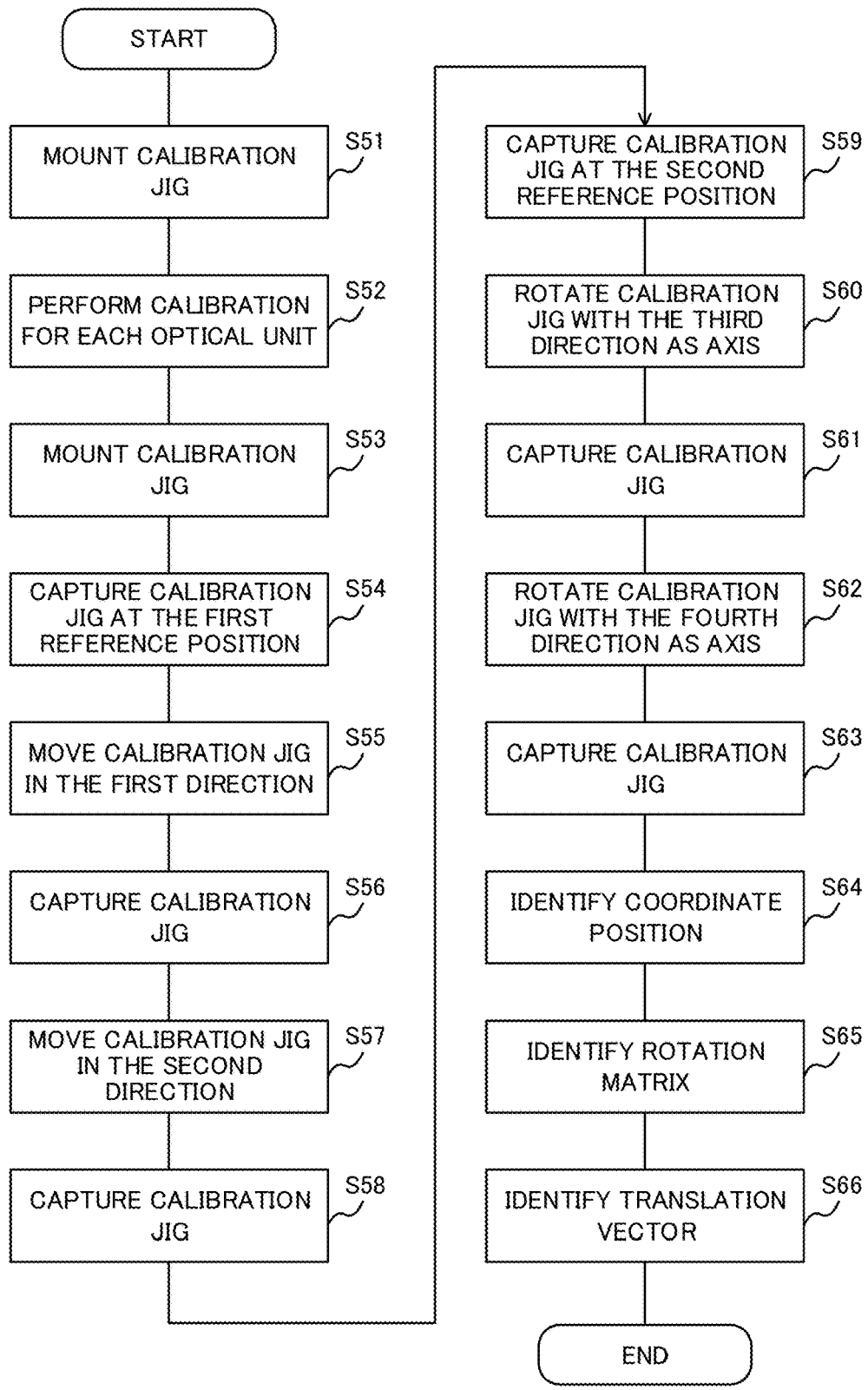
FIG. 4 shows an example of an operation flow of the measurement apparatus.

FIG. 4 shows an example of an operation flow of the measurement apparatus 10 according to the present embodiment. The measurement apparatus 10 executes operations from S51 to S66 shown in FIG. 4 to identify the calibration parameters used for the calibration of the measurement apparatus 10 itself. Although the measurement apparatus 10 includes the plurality of optical units 130, in this operation flow, an operation example using the first optical unit 130a and the second optical unit 130b will be described in a simplified manner.

First, the measurement apparatus 10 performs calibration for each optical unit 130 before calibrating the measurement apparatus 10 using the calibration jig 30. In this case, the measurement apparatus 10 calibrates each optical unit 130 using a reference jig that is smaller in size than the calibration jig 30. The size of the reference jig is a size that fits in the field of view of the imaging part 132 included in one optical unit 130, for example.

The reference jig has a plurality of reference measuring elements, for which at least one of dimensions or positional relationship is known. The reference measuring element, as an example, has approximately the same shape as the element to be measured 31. Alternatively, the reference jig may have a shape with known dimensions. Such a small reference jig shows little change over time and is a commonly used jig that is easy to handle. Since the calibration for each optical unit 130 using such a reference jig is well known, the operation of the calibration will be briefly described here.

First, the stage 110 of the measurement apparatus 10 is mounted with a reference jig thereon (S51). A plurality of reference jigs may be mounted on the stage 110, or instead, one reference jig may be mounted thereon. In a case where a plurality of reference jigs are mounted on the stage 110, it is desirable to dispose the plurality of reference jigs such that they are included in the respective fields of view of the optical units 130. Then, the control part 240 performs calibration for each optical unit 130 (S52).

For example, the control part 240 captures the reference jig with the first imaging part 132a of the first optical unit 130a, and calibrates a first coordinate system indicating first coordinate positions in the field of view 133a of the first imaging part 132a on the basis of a capturing result of the first imaging part 132a. Then, the control part 240 identifies a first coefficient to be multiplied by the measurement result of the three-dimensional geometry so that the measurement result of the three-dimensional geometry of the reference measuring element of the reference jig matches the known dimensions and positional relationship of the reference measuring element.

Next, the control part 240 captures the reference jig with the second imaging part 132b of the second optical unit 130b, and calibrates a second coordinate system indicating second coordinate positions in the field of view 133b of the second imaging part 132b on the basis of a capturing result of the second imaging part 132b. In a case where one reference jig is mounted on the stage 110, when the calibration of the first optical unit 130a is finished, the control part 240 causes the stage 110 to be moved such that the reference jig is included in the field of view of the second optical unit 130b, which will be calibrated next, and then begins the calibration of the second optical unit 130b, for example.

In a similar manner as in the calibration of the first optical unit 130a, the control part 240 identifies a second coefficient to be multiplied by the measurement result of the three-dimensional geometry so that the measurement result of the three-dimensional geometry of the reference measuring element based on the capturing result of the second imaging part 132b matches the known dimensions and positional relationship of the reference measuring element. As described above, the control part 240 calibrates each of the plurality of optical units 130. The control part 240 may store the identified coefficients in the storage 220.

Next, the stage 110 of the measurement apparatus 10 has the calibration jig 30 mounted thereon (S53). Next, the control part 240 captures the calibration jig 30 disposed at a first reference position (S54). The first reference position is a predetermined position such as an initial position of the stage 110, for example. For example, when the calibration jig 30 is disposed at the first reference position, it is desirable that a positional relationship between the calibration jig 30, the plurality of optical units 130, and the first reference position is determined in advance such that a plurality of elements to be measured 31 of the calibration jig 30 are in the fields of view 133 of the plurality of imaging parts 132.

For example, the control part 240 causes the stage 110 to be moved and then disposes the calibration jig 30 at the first reference position. Then, after turning on the light sources 131 of the plurality of optical units 130, the control part 240 captures the calibration jig 30 by using the imaging parts 132. By doing this, at the first reference position, the first imaging part 132a captures the first element to be measured 31a from among the plurality of elements to be measured 31 included in the calibration jig 30, and the second imaging part 132b, which is different from the first imaging part 132a, captures the second element to be measured 31b, which is different from the first element to be measured 31a.

Next, the control part 240 causes the calibration jig 30 to be moved in a predetermined first direction from the first reference position (S55). For example, the control part 240 causes the stage 110 to be moved by a predetermined distance in the first direction. It is desirable that the control part 240 causes the stage 110 to be moved in the first direction within a range in which the plurality of elements to be measured 31 of the calibration jig 30 are included in the fields of view of the plurality of imaging parts 132.

Then, the control part 240 captures the calibration jig 30 by using the plurality of optical units 130 (S56). After turning on the light sources 131 of the plurality of optical units 130, the control part 240 captures the calibration jig 30 by using the imaging part 132. By doing this, the first imaging part 132a captures the first element to be measured 31a that has been moved in the first direction, and the second imaging part 132b captures the second element to be measured 31b that has been moved in the first direction.

Next, the control part 240 causes the calibration jig 30 to be moved in a predetermined second direction, different from the first direction, from the first reference position (S57). For example, after moving the stage 110 back to the first reference position, the control part 240 causes the stage 110 to be moved by a predetermined distance in the second direction. Alternatively, after causing the stage 110 to be moved by the predetermined distance in the second direction, the control part 240 may move the stage 110 back by the distance moved in S55 in the direction opposite to the first direction.

Alternatively, the control part 240 may cause the stage 110 to be moved by the predetermined distance in the second direction and subtract the distance moved in S55 from the measurement result. It is desirable that the control part 240 causes the stage 110 to be moved in the second direction within the range in which the plurality of elements to be measured 31 of the calibration jig 30 are included in the fields of view of the plurality of imaging parts 132.

Then, the control part 240 captures the calibration jig 30 by using the plurality of optical units 130 (S58). The control part 240 captures the calibration jig 30 by the same operation as in S56. By doing this, the first imaging part 132a captures the first element to be measured 31a that has been moved in the second direction, and the second imaging part 132b captures the second element to be measured 31b that has been moved in the second direction.

Next, the control part 240 captures the calibration jig 30 disposed at a second reference position (S59). The second reference position is a predetermined position such as the initial position of the stage 110, for example. Similarly to the first reference position, the second reference position is a position at which the plurality of elements to be measured 31 of the calibration jig 30 are in the fields of view 133 of the plurality of imaging parts 132, when the calibration jig 30 is disposed at said second reference position.

For example, after causing the stage 110 to move to the second reference position, the control part 240 captures the calibration jig 30 by using the imaging part 132 in the same manner as in the operation in S54. The second reference position may be the position of the calibration jig 30 after having been moved in the second direction. In this case, since the operation in S59 has the same result as the operation in S58, the operation in S59 may be omitted. Further, the second reference position may be the same position as the first reference position, and in this case, since the operation in S59 has the same result as the operation in S54, the control part 240 may simply move the calibration jig 30 to the second reference position.

Next, the control part 240 causes the calibration jig 30 to be rotated in a predetermined direction about an axis oriented in a predetermined third direction (S60). For example, the control part 240 causes the stage 110 to be rotated by a predetermined angle θ within a range in which the plurality of elements to be measured 31 of the calibration jig 30 are in the fields of view 133 of the plurality of imaging parts 132.

Then, the control part 240 captures the calibration jig 30 by using the plurality of optical units 130 (S61). The control part 240 captures the calibration jig 30 by performing the same operation as in S56. As a result, the first imaging part 132a captures the first element to be measured 31a after the rotation about the axis oriented in the third direction, and the second imaging part 132b captures the second element to be measured 31b after the rotation about the axis oriented in the third direction.

Next, the control part 240 causes the calibration jig 30 to be rotated in a predetermined direction about an axis oriented in a predetermined fourth direction, which is different from the third direction (S62). For example, after rotating the stage 110 back by the predetermined angle θ about the axis oriented in the third direction, the control part 240 causes the stage 110 to be rotated by a predetermined angle q about the axis oriented in the fourth direction, within the range in which the plurality of elements to be measured 31 of the calibration jig 30 are in the fields of view 133 of the plurality of imaging parts 132.

Alternatively, after causing the stage 110 to be rotated by the predetermined angle q about the axis oriented in the fourth direction, the control part 240 may rotate the stage 110 back by the predetermined angle θ about the axis oriented in the third direction. Alternatively, the control part 240 may cause the stage 110 to be rotated by the predetermined angle q about the axis oriented in the fourth direction, and subtract an amount of a rotation of the stage 110 rotated by the predetermined angle q about the axis oriented in the fourth direction from the measurement result.

The control part 240 captures the calibration jig 30 using the plurality of optical units 130 (S63). The control part 240 captures the calibration jig 30 by the same operation as in S61. As described above, the control part 240 outputs the control signal from the signal output part 241, and captures, while moving the calibration jig 30, the elements to be measured 31 with the plurality of imaging parts 132 before and after the moving of the calibration jig 30. Then, the acquisition part 242 acquires the capturing results of the imaging parts 132.

In FIG. 4, an example has been described in which the control part 240 executes the following: moving the calibration jig 30 in the first direction, moving it in the second direction, rotating it by the angle θ, and rotating it by the angle φ, in this order, but the present disclosure is not limited thereto. The control part 240 may execute the moving the calibration jig 30 in the first direction, moving it in the second direction, rotating it by the angle θ, and rotating it by the angle φ in an order different from that of FIG. 4.

Next, the control part 240 identifies a coordinate position of the element to be measured 31 for each position to which the calibration jig 30 was moved, on the basis of the capturing results of the plurality of imaging parts 132 (S64). For example, the measurement part 243 identifies first coordinate positions indicating a position of the first element to be measured 31a in the first coordinate system based on the field of view of the first imaging part 132a in a plurality of captured images captured by the first imaging part 132a. Further, the measurement part 243 identifies second coordinate positions indicating a position of the second element to be measured 31b in the second coordinate system based on the field of view of the second imaging part 132b in a plurality of captured images captured by the second imaging part 132b.

After the operation in S64 in FIG. 4, the rotation matrix identification part 244 of the control part 240 identifies a rotation matrix for rotating the coordinates such that a direction in which the first coordinate position is moved and a direction in which the second coordinate position is moved coincide with each other before and after the moving of the calibration jig 30 in the first direction and the second direction (S65). After the operation in S65, the translation vector identification part 245 identifies a translation vector for translating the coordinates such that the distance between the first element to be measured 31a and the second element to be measured 31b is the same before and after the rotation.

<Configuration Example of the Calibration Jig 300>

Figure 5:
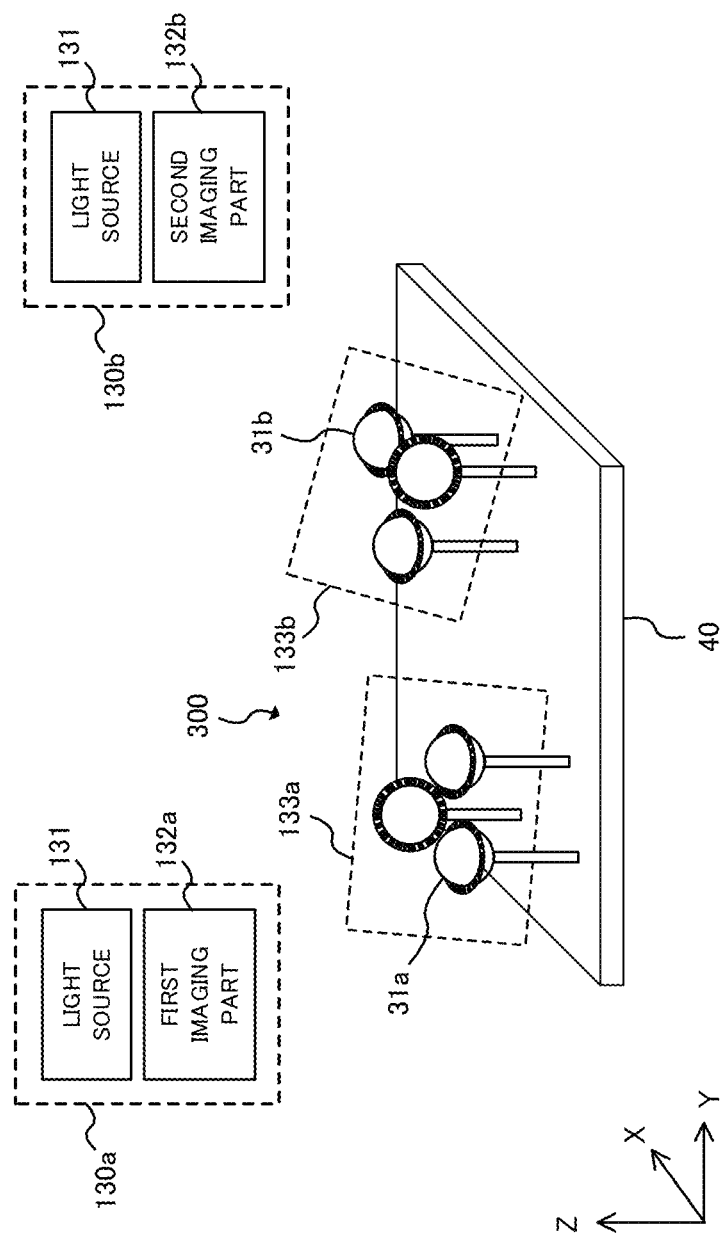
FIG. 5 shows a first configuration example of the calibration jig.

FIG. 5 shows a first configuration example of the calibration jig 300 according to the present embodiment. In the calibration jig 300 shown in FIG. 5, operations approximately the same as those of the calibration jig 30 according to the present embodiment shown in FIG. 2 are denoted by the same reference numerals, and redundant description thereof is omitted. In other words, the calibration jig 300 functions as the calibration jig 30 shown in FIG. 2. The calibration jig 300 may be formed as a reference jig for performing calibration for each optical unit 130. The calibration jig 300 includes a plurality of elements to be measured 31 and a frame part 40.

The plurality of elements to be measured 31 are attached to the frame part 40. Although FIG. 5 shows an example in which the frame part 40 is a plate member, it is not limited thereto. The frame part 40 may be any member as long as it can fix the elements to be measured 31, and may be a rod-shaped member or the like.

Similarly to FIG. 2, FIG. 5 shows an example in which the first element to be measured 31*a* is in the field of view 133*a* of the first imaging part 132*a* of the first optical unit 130*a*, and the second element to be measured 31*b* is in the field of view 133*b* of the second imaging part 132*b* of the second optical unit 130*b*. It should be noted that although the number of elements to be measured 31 in FIG. 5 is fewer than that of FIG. 2, more elements to be measured 31 may be attached to the frame part 40.

<First Configuration Example of an Element to be Measured 31>

FIGS. 6A and 6B each show a first configuration example of an element to be measured 31 according to the present embodiment. As shown in FIG. 6A, the element to be measured 31 includes a main body part 32, a label part 33, and a plate member 34. The main body part 32 has a predetermined shape. The shape of the main body part 32 is, for example, a solid of revolution, such as a sphere, an ellipsoid, or a cylinder. Alternatively, the shape of the main body part 32 may be a polyhedron.

FIGS. 6A and 6B each show an example in which a plurality of label parts 33 are attached to the plate member 34 by a known method such as printing or sticking, and the label parts 33 are provided on the main body part 32 via the plate member 34. It is desirable that the label parts 33 are provided on many parts of the main body part 32. For example, the main body part 32 has a plurality of plate members 34, and the plurality of label parts 33 are provided at a plurality of different positions on the main body part 32 to such an extent that at least one label part 33 is included in the captured images when the element to be measured 31 is captured from various angles.

The plate member 34 is a belt-shaped member provided around the main body part 32. A plurality of label parts 33 may be provided on the plate member 34. It is desirable that the plurality of label parts 33 are provided on both the front and back surfaces of the plate member 34. FIGS. 6A and 6B each show an example in which four label parts 33 are provided on one of the surfaces of the plate member 34. The label parts 33 may be provided on the plate member 34 as described above, or on other parts of the main body part 32, in place of or in addition to the plate member 34.

FIG. 6B shows an example in which a single label part 33, which is shown from L1 to L2 of the plate member 34 shown in FIG. 6A, is shown in a rectangular shape. The label part 33 includes a recognition code 35 and an identification code 36, for example.

The recognition code 35 is a code common to the plurality of elements to be measured 31 for recognizing the label part 33. The identification code 36 is a code for identifying the element to be measured 31. It is desirable that the recognition code 35 and the identification code 36 are codes of different shapes or codes of different types. For example, the identification code 36 is composed of a combination of basic portions of a predetermined first shape, and the recognition code 35 is composed of a combination of basic portions of a predetermined second shape that is different in size from the first shape.

FIGS. 6A and 6B each show an example in which the recognition code 35 and the identification code 36 are displayed as barcodes having different line widths. As one example, a minimum line width d of the recognition code 35 is half of a minimum line width D of the identification code 36. Each of the recognition code 35 and the identification code 36 indicates a predetermined value. As one example, the recognition code 35 indicates a predetermined 8-bit value (01010101), and the identification code 36 indicates a predetermined 8-bit value (01001010).

<Second Configuration Example of the Calibration Jig 300>

Figure 7:
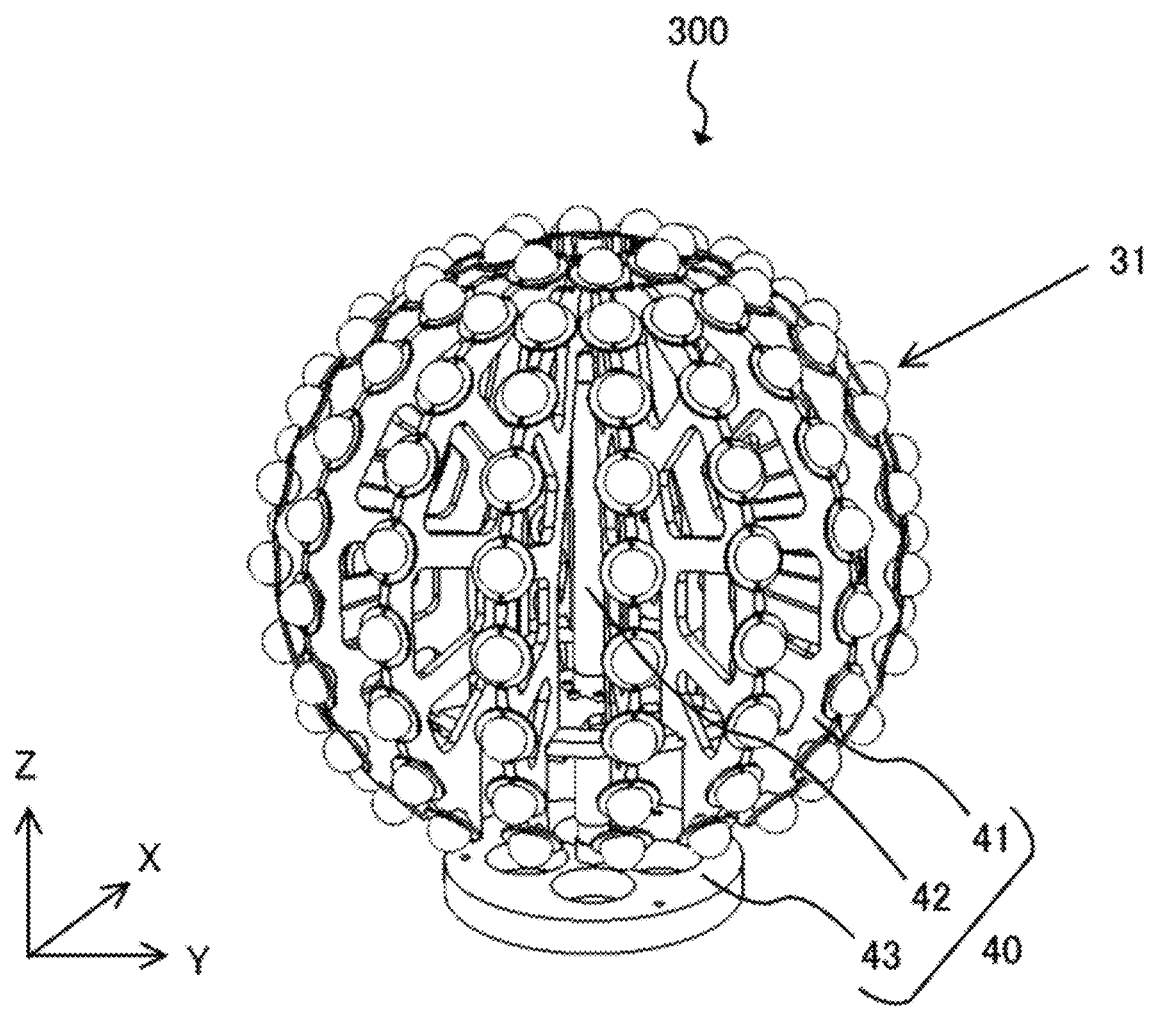
FIG. 7 shows a second configuration example of the calibration jig.

FIG. 7 shows a second configuration example of the calibration jig 300 according to the present embodiment. In the calibration jig 300 of the second configuration example, the frame part 40 has a spherical or ellipsoidal shape. The frame part 40 may be formed into a spherical or ellipsoidal shape by combining a plurality of rod-shaped members or the like, at least in part. Further, the frame part 40 may have a member having a shape of at least a part of a sphere or an ellipsoid.

The frame part 40 includes a plurality of rod-shaped members 41 that are also arc-shaped, a columnar member 42, and a pedestal 43, for example. The plurality of rod-shaped members 41 may be attached to the columnar member 42 so as to be rotatable about the columnar member 42 as an axis. The columnar member 42 is attached to the pedestal 43. It is desirable that surfaces of the plurality of rod-shaped members 41 in contact with the outside form a spherical surface or an ellipsoid.

Each of the arc-shaped, rod-shaped members 41 is provided to be movable in a Z-direction. Each of the arc-shaped, rod-shaped members 41 may be configured to be movable in a circumferential direction of a circle drawn by the arc. A plurality of elements to be measured 31 are fixed to the outside of the plurality of rod-shaped members 41. In this way, the plurality of elements to be measured 31 can be arranged in a spherical arrangement or an ellipsoidal arrangement. FIG. 7 shows an example of a spherical frame part 40 in which the columnar member 42 extends in the Z-direction and the plurality of rod-shaped members 41 are provided so as to be rotatable about the Z-direction as an axis.

Arrangement positions and/or orientations of the plurality of imaging parts 132 may be changed depending on the measurement target. By arranging the plurality of elements to be measured 31 in such a spherical arrangement, the plurality of elements to be measured 31 can be included in the respective fields of view of imaging parts 132 even when the arrangement positions and/or orientations of the imaging parts 132 are changed. The imaging parts 132 may be disposed to surround the measurement target. In this case, the arrangement positions and orientations may differ for each imaging part 132. Even in such a case, by arranging the plurality of elements to be measured 31 in the spherical arrangement, it is possible to include the plurality of elements to be measured 31 in the respective fields of view of imaging parts 132.

Each of the plurality of elements to be measured 31 is provided on a sphere-shaped or ellipsoid-shaped surface of the frame part 40. The plurality of elements to be measured 31 are provided such that adjacent elements to be measured 31 are within a predetermined distance range on a spherical surface of the sphere formed by the frame part 40, for example. Here, for example, when the main body part 32 of the element to be measured 31 is a sphere, the predetermined distance is about twice to four times the diameter of the sphere. When the main body part 32 of the element to be measured 31 is an ellipsoid, the predetermined distance may be about twice to four times the major axis of the ellipsoid.

It is desirable that the elements to be measured 31 are disposed so that the label part 33 is included in fields of view of more imaging parts 132. An example is conceived of in which the frame part 40 is regarded as a spheroid having the Z-direction as a rotation axis, and has spherical coordinates similar to those of a celestial body or the like. The plurality of elements to be measured 31 are desirably arranged in the same latitude direction and/or the same longitude direction of such a spheroid. In addition, each of the elements to be measured 31 is disposed such that at least one label part 33 is shown within a side that is orthogonal to the normal direction of the spheroid and faces the outside of the frame part 40, for example.

For example, it is desirable that the plurality of elements to be measured 31 are densely arranged on the spherical surface of the sphere so that even when the imaging parts 132 capture a part of the calibration jig 300, a plurality of elements to be measured 31 on which the label part 33 can be read are included in the captured images. In this way, it is possible to identify the plurality of elements to be measured 31 in the captured images of the calibration jig 300 captured by the plurality of imaging parts 132 just by mounting only one calibration jig 300 of the second configuration example on the stage 110.

Therefore, as described above, it is possible to identify the calibration parameters to be used for the calibration of the plurality of imaging parts 132 themselves on the basis of the captured images of the calibration jig 300 obtained by the plurality of imaging parts 132 before and after the moving of the calibration jig 300. An example has been described in which the calibration jig 300 is mounted on the stage 110 and is moved in identifying the calibration parameters described above, but the present disclosure is not limited thereto. Apart from the moving of the stage 110, the calibration jig 300 may be configured so that the plurality of elements to be measured 31 can be moved while maintaining their relative positional relationship.

The calibration jig 300 further includes a frame moving part that moves the frame part 40 together with the plurality of elements to be measured 31, for example. The frame moving part includes an actuator such as a motor, and moves the frame part 40 in a plurality of predetermined directions. Further, the frame moving part may rotate the frame part 40 about an axis oriented in a predetermined direction. The frame moving part is configured so that it can move the plurality of elements to be measured 31 in an X-direction, a Y-direction, and a Z-direction, for example. In addition, the frame moving part may be configured so that it can rotate the plurality of elements to be measured 31 about the X-direction, the Y-direction, and the Z-direction as rotation axes. In this way, the measurement apparatus 10 can identify the calibration parameters to be used for calibration by moving the frame part 40 of the calibration jig 300, without moving the stage 110.

For example, in S54 of the operation flow shown in FIG. 4, the control part 240 captures the calibration jig 300 disposed at the first reference position. The first imaging part 132*a* captures the calibration jig 300 so that some of the first elements to be measured 31*a* from among the plurality of elements to be measured 31 provided in the calibration jig 300 are included in its field of view. The second imaging part 132*b*, which is different from the first imaging part 132*a*, captures the calibration jig 300 so that some of the second elements to be measured 31*b*, which are different from the first elements to be measured 31*a* captured by the first imaging part 132*a*, are included in its field of view.

The capturing of the calibration jig 300 in S58, S59, S61, and S63 is the same as that in S54. In addition, in S55, S57, S60, and S62, the control part 240 may move the stage 110, or instead, may move the calibration jig 300 by controlling the frame moving part of the calibration jig 300.

Then, in S64, the measurement part 243 analyzes the label parts 33 of the elements to be measured 31 from the captured images captured by the first imaging part 132*a* to identify the first elements to be measured 31*a*. The measurement part 243 identifies first coordinate positions indicating positions of the identified first elements to be measured 31*a* in the first coordinate system based on the field of view of the first imaging part 132*a*.

Similarly, the measurement part 243 analyzes the label parts 33 of the elements to be measured from the captured images captured by the second imaging part 132*b* to identify the second elements to be measured 31*b*. The measurement part 243 identifies second coordinate positions indicating positions of the identified second elements to be measured 31*b* in the second coordinate system based on the field of view of the second imaging part 132*b*.

After S64, as described above, the calibration parameters for calibrating the first imaging part 132*a* and the second imaging part 132*b* can be identified from positional relationships between the identified first elements to be measured 31*a* and the identified second elements to be measured 31*b*.

Further, in S51 and S52 of the operation flow shown in FIG. 4, an example has been described in which each optical unit 130 is calibrated using the reference jig that is smaller in size than the calibration jig 30. Here, since the size of the calibration jig 300 of the second configuration example can be made smaller than the size of the calibration jig 30, the calibration jig 300 may also function as the reference jig.

For example, the calibration jig 300 can be used as the reference jig by storing measured dimensions and positional relationships of at least a subset of the plurality of elements to be measured 31 in the storage 220 or the like in advance. In other words, the measurement apparatus 10 can execute the operation flow shown in FIG. 4 using one calibration jig 300.

<Third Configuration Example of the Calibration Jig>

It has been described above that the calibration jig may be configured so that the plurality of elements to be measured can be moved while maintaining their relative positional relationship. Hereinafter, an example of such a calibration jig will be described with reference to FIG. 8 to FIGS. 14A and 14B.

Figure 8:
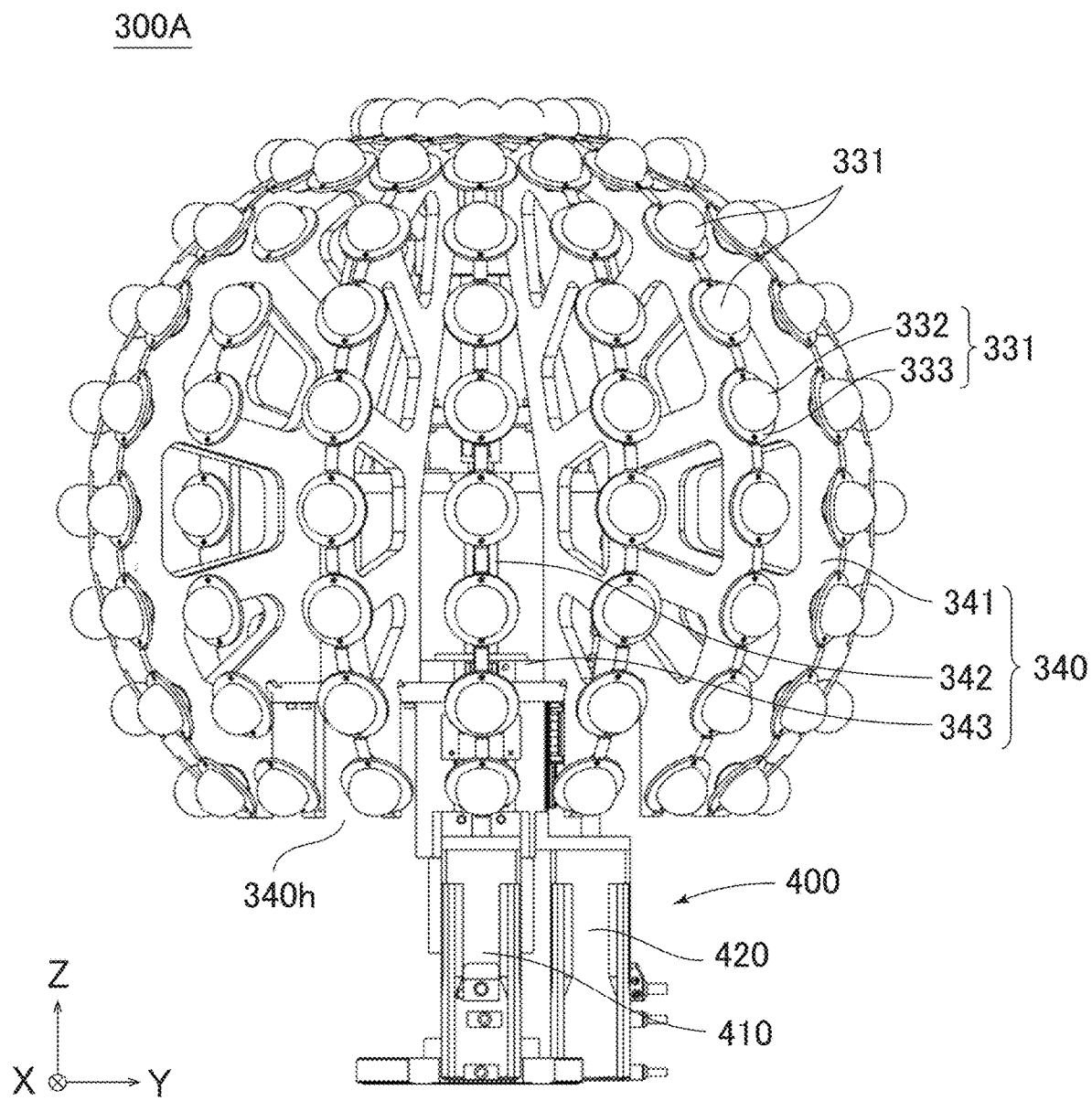
FIG. 8 is a side view of a calibration jig according to one aspect of the present disclosure.
Figure 9:
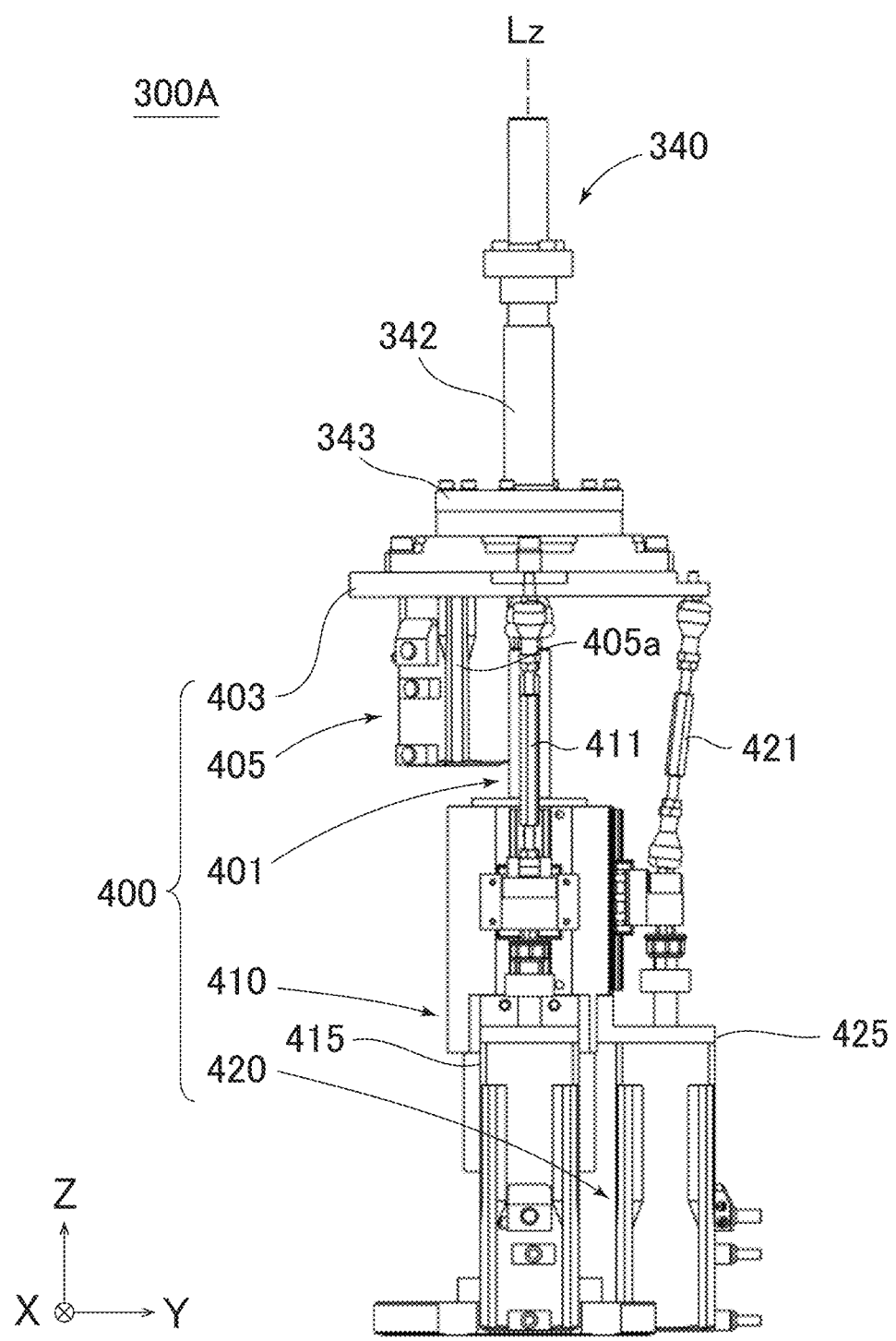
FIG. 9 is a diagram showing a state in which a frame member is removed from the calibration jig of FIG. 8.
Figure 10:
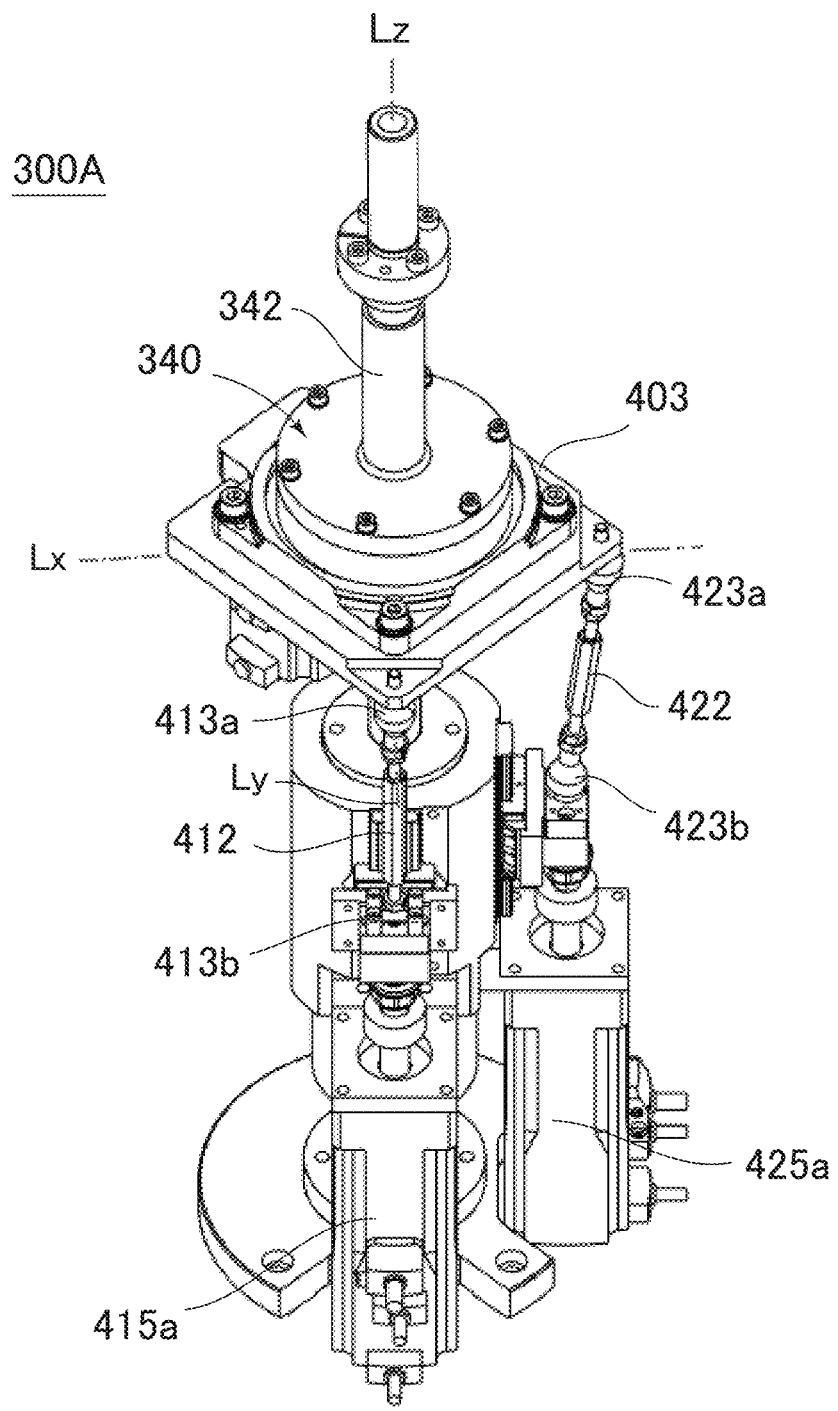
FIG. 10 is a perspective view of the calibration jig in the state in which the frame member is removed.
Figure 11:
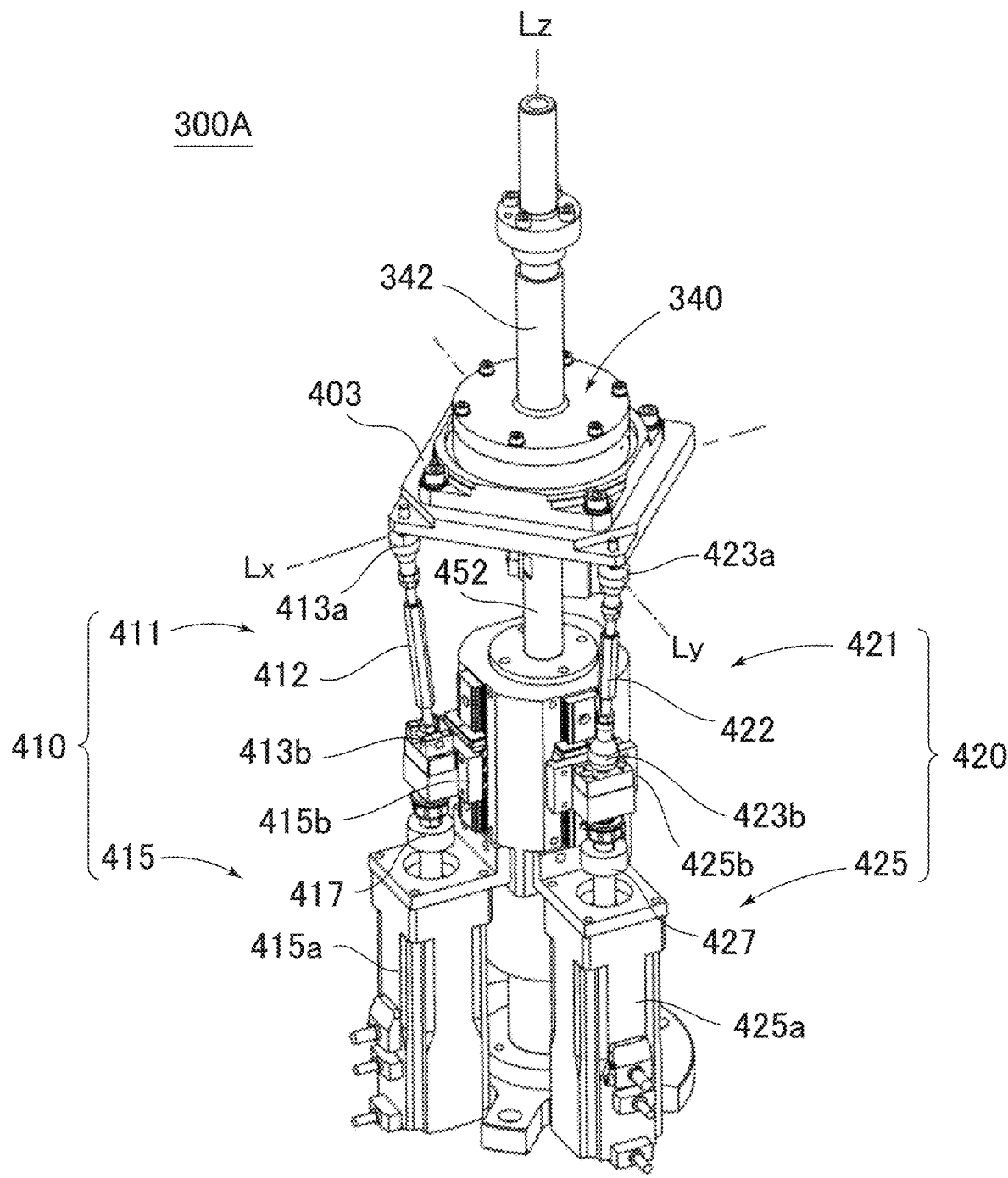
FIG. 11 is a perspective view of the calibration jig in the state in which the frame member is removed, viewed from another direction.

FIG. 8 is a side view of a calibration jig 300A according to one aspect of the present disclosure. FIG. 9 is a diagram showing a state in which a frame member is removed from the calibration jig 300A of FIG. 8. FIG. 10 is a perspective view of the calibration jig 300A in the state in which the frame member is removed. FIG. 11 is a perspective view of the calibration jig 300A in the state where the frame member is removed, viewed from another direction.

As shown in FIG. 8, the calibration jig 300A includes a plurality of elements to be measured 331, a frame part 340, and a mechanism part 400. Since the element to be measured 331 and the frame part 340 have the same configuration as the element to be measured 31 and the frame part 40 described above, detailed description thereof is omitted. One of the features of the calibration jig 300A is that the plurality of elements to be measured 331 and the frame part 340 can move about each axis: a central axis Lx (roll axis), a central axis Ly (pitch axis), and a central axis Lz (yaw axis), shown in FIG. 11.

As shown in FIG. 8, the element to be measured 331 includes a main body part 332 and a label part 333. The main body part 332 is a sphere, for example. The label part 333 is an annular plate-shaped member provided on an outer peripheral surface of the main body part 332. The label part 333 is the same as the one exemplified in FIG. 6, and includes a display of an identification code for identifying the element to be measured 331.

The frame part 340 is a member that forms an outer peripheral surface of the sphere, and the plurality of elements to be measured 331 are attached to the outer peripheral surface. As shown in FIGS. 8 and 9, the frame part 340 includes a frame member 341, a columnar member 342, and a pedestal 343.

As described with reference to FIG. 7, the frame member 341 has an outer peripheral part that forms an arc. The frame member 341 is removably attached to the columnar member 342. In the example of FIG. 8, a plurality of frame members 341 are provided so as to extend radially about the columnar member 342. The plurality of frame members 341 provided in this manner form the spherical outer peripheral surface to which the element to be measured 331 is attached.

The plurality of frame members 341 are connected to each other as one spherical subassembly, for example. The spherical subassembly is removably attached to the columnar member 342.

The spherical outer peripheral surface formed by the plurality of frame members 341 is not completely closed, and an opening 340*h* (FIG. 8) is provided at a part of a lower end side. As described above, since a part of the sphere is opened, it is possible to insert a portion of the mechanism part 400 inside the sphere.

As shown in FIG. 9, the frame part 340 is supported by the mechanism part 400. Specifically, the frame part 340 is supported by the mechanism part 400 by attaching a pedestal 343 provided with a columnar member 342 on its upper surface to a support member 403 (described in detail later).

(Mechanism Part 400)

The mechanism part 400 is a mechanism that moves the frame part 340 in a predetermined direction on a stage of a coordinate measurement machine, for example. As shown in FIG. 9, the mechanism part 400 includes a supporting body 401, a support member 403, a rotation mechanism 405, a first swinging mechanism 410, and a second swinging mechanism 420.

The supporting body 401 extends in a Z-axis direction and supports various components constituting the mechanism part 400. Specifically, the supporting body 401 supports the first swing mechanism 410, the second swing mechanism 420, and the support member 403.

The support member 403 supports the frame part 340 and is provided on an upper portion of the supporting body 401. As shown in FIGS. 10 and 11, the support member 403 is a plate-shaped member, as an example. The outer shape of the support member 403 is a quadrangle, for example. As shown in FIG. 11, the support member 403 is configured to be swingable about the central axis Lx extending in an X-axis direction and the central axis Ly extending in a Y-axis direction. A structure that swingably supports the support member 403 will be described later with reference to other drawings.

(Rotation Mechanism 405)

The rotation mechanism 405 (FIG. 9) rotates the frame part 340 about the central axis Lz in the Z-axis direction. In this example, the rotation mechanism 405 rotates the frame part 340 by 360 degrees or more, for example. The rotation mechanism 405 may rotate the frame part 340 within an angle range of less than 360 degrees.

The rotation mechanism 405 includes a rotary motor 405*a* as a driving source that generates a driving force for rotating the frame part 340. As an example, the rotary motor 405*a* is attached to a lower surface of the support member 403. By having the driving force from the rotary motor 405*a* transmitted to the pedestal 343 via a transmission mechanism (not shown), the frame part 340 rotates about the central axis Lz in the Z-axis direction. It should be noted that although the frame part 340 rotates on the support member 403, the support member 403 itself does not rotate. In this example, the rotation mechanism 405 is disposed such that it is positioned inside the contour of the support member 403 in a planar view.

Regarding the arrangement of the rotation mechanism 405, the first swing mechanism 410, and the second swing mechanism 420, it is assumed that all of these mechanisms are collectively disposed at approximately the same position (approximately the same height) in a direction along the central axis Lz, for example. However, in the case of such a configuration, the size (projected area) of a mechanism part when the mechanism part is projected in an XY plane becomes large.

Such a mechanism part is unsuitable for disposing the mechanism part such that a part of it is accommodated inside the frame member 341, which is a sphere. Further, in a configuration where such a mechanism part is disposed outside the sphere (for example, below the sphere), there is a large structure under the frame member 341. Consequently, it becomes difficult to capture the element to be measured 331 from below.

Therefore, in the calibration jig 300A, the first swing mechanism 410 and the second swing mechanism 420 are disposed at a first position in the direction along the central axis Lz, and the rotation mechanism 405 is disposed at a second position, which is closer to the support member 403 than the first position. Specifically, as shown in FIG. 9, a first linear actuator 415 of the first swing mechanism 410 and a second linear actuator 425 of the second swing mechanism 420 are provided below the rotation mechanism 405. With such a configuration, the rotation mechanism 405, the first swing mechanism 410, and the second swing mechanism 420 can be disposed in a compact manner around the central axis Lz.

(First Swing Mechanism 410)

As shown in FIG. 11, the first swinging mechanism 410 swings the frame part 340 about the central axis Ly. The first swing mechanism 410 includes a first movable part 411 and the first linear actuator 415.

Specifically, the first movable part 411 includes a first coupling arm 412, a ball joint 413*a*, and a knuckle joint 413*b*. One end of the first movable part 411 is coupled to the support member 403. The first movable part 411 moves in the Z-axis direction by receiving force from the first linear actuator 415, thereby applying force to the support member 403 to move the support member 403.

The first linear actuator 415 includes a linear motor 415*a* and a linear guide 415*b*. The linear motor 415*a* moves its movable arm 417 in the Z-axis direction with the driving force of a pulse motor, for example.

The linear guide 415*b* is provided such that it is positioned between the linear motor 415*a* and the first movable part 411. The linear guide 415*b* has a rail provided so as to extend in the Z-axis direction, and a moving block that reciprocates along the rail. The linear guide 415*b* transmits force from the linear motor 415*a* to the first movable part 411.

The first coupling arm 412 couples the first linear actuator 415 and the support member 403. The ball joint 413*a* is provided at one end (upper end) of the first coupling arm 412. The first coupling arm 412 is coupled to the support member 403 via the ball joint 413*a*. Specifically, the upper end of the first coupling arm 412 is coupled to the support member 403 at a position close to the outer circumference of the lower surface of the support member 403. In the calibration jig 300A, a ball joint is used as a connecting part between the first movable part 411 and the support member 403. As described below, similarly, a ball joint 423a is used as a connecting part between a second coupling arm 422 of the second swing mechanism 420 and the support member 403.

The centers of the ball joint 413a and the ball joint 423a may be located in mutually different planes orthogonal to the Z axis, but in the calibration jig 300A, the centers of the ball joint 413a and the ball joint 423a are located in the same plane. An effect of such a configuration will be described later together with the description of a swivel center of the frame part 340.

The knuckle joint 413b is provided at the lower end of the first coupling arm 412. The first coupling arm 412 and the first linear actuator 415 are coupled via the knuckle joint 413b. The knuckle joint 413b is a component that allows an object to rotate about one axis. In the example of FIG. 11, the first coupling arm 412 is coupled to a movable arm 417 of the first linear actuator 415 by the knuckle joint 413b that rotatably supports the first coupling arm 412 about a central axis (about one axis) parallel to the direction of the central axis Ly. A ball joint may be used at this connection point, but by using the knuckle joint as shown in FIG. 11, the accuracy of movement of the first coupling arm 412 is improved. As a result, it is possible to improve positional accuracy of the support member 403 and the plurality of elements to be measured 331 that move together with the support member 403.

(Second Swing Mechanism 420)

The second swing mechanism 420 is the same as the first swing mechanism 410 except that (i) an arrangement position of the mechanism part 400 is different from that of the first swing mechanism 410 and (ii) the lower end of the second coupling arm 422 is a ball joint 423b. The second swinging mechanism 420 swings the frame part 340 about the central axis Lx. As shown in FIG. 11, the second swing mechanism 420 is disposed at a position shifted by 90 degrees in the circumferential direction of the central axis Lz with respect to the first swing mechanism 410.

The second swing mechanism 420 includes a second movable part 421 and a second linear actuator 425, in the same manner as the configuration of the first swing mechanism 410. The second movable part 421 includes the second coupling arm 422, the ball joint 423a, and the ball joint 423b.

One end of the second movable part 421 is coupled to the support member 403. The second movable part 421 moves in the Z-axis direction by receiving force from the second linear actuator 425, thereby applying force to the support member 403 to move the support member 403.

The linear motor 425a moves its movable arm 427 in the Z-axis direction with the driving force of the pulse motor. A linear guide 425b transmits force from the linear motor 425a to the second coupling arm 422.

The second coupling arm 422 couples the second linear actuator 425 and the support member 403. The ball joint 423a and the ball joint 423b are provided at an upper end and a lower end of the second coupling arm 422, respectively. Similarly to the first movable part 411, the second coupling arm 422 is coupled to the lower surface of the support member 403 via the ball joint 423a. In this example, a distance from the central axis Lx to the ball joint 413a (distance in a planar view) is the same as a distance from the central axis Lx to the ball joint 423a (distance in a planar view).

A knuckle joint may be used for coupling the second coupling arm 422 and the second linear actuator 425. In the case of the configuration in which the knuckle joints are used for both the first coupling arm 412 and the second coupling arm 422, improvement in positional accuracy of the frame part 340 and the element to be measured 331 attached thereto can be expected. However, high dimensional accuracy will be required when assembling the mechanism part 400. Therefore, in the calibration jig of one embodiment of the present disclosure, a knuckle joint is used for the first coupling arm 412 and a ball joint is used for the second coupling arm 422 as shown in FIG. 11. Whether the ball joint or the knuckle joint is used at the end of a coupling arm may be appropriately selected according to the required accuracy and other factors for the calibration jig.

The mechanism part 400 configured as described above is provided in a shape such that the mechanism part 400 fits inside a circle, which is an outer shape of the frame part 340, when viewed by projecting the mechanism part 400 and the frame part 340 in the Z direction. According to such a configuration, the projected area of the calibration jig 300A is reduced. Further, it is easy to capture the plurality of elements to be measured 331 arranged in a spherical shape from below.

(Swinging of the Support Member 403 and the Frame Part 340 Supported Thereby)

Figure 12:
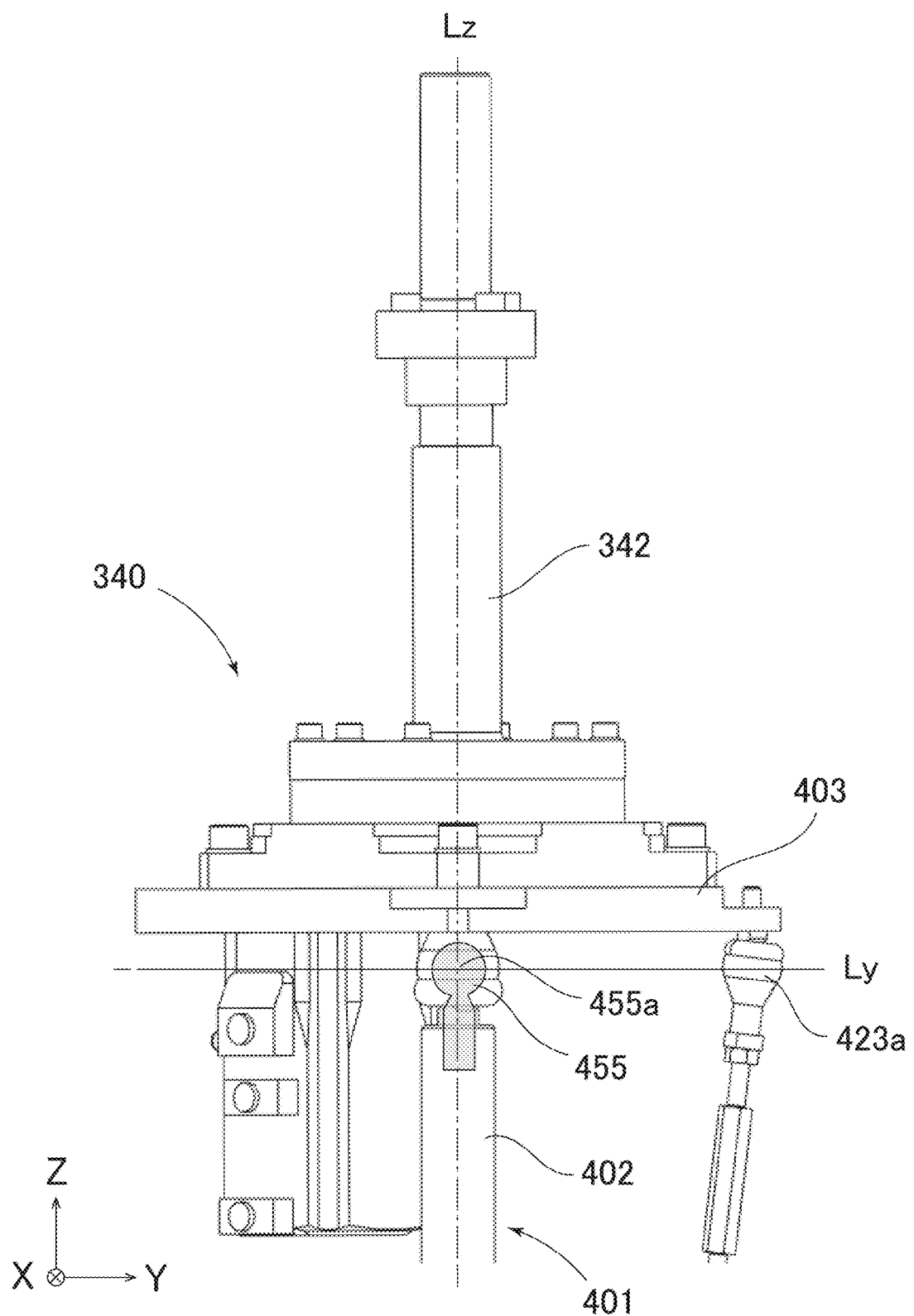
FIG. 12 is an enlarged view of a structure that supports the frame part such that it can swing in the mechanism part.
Figure 13:
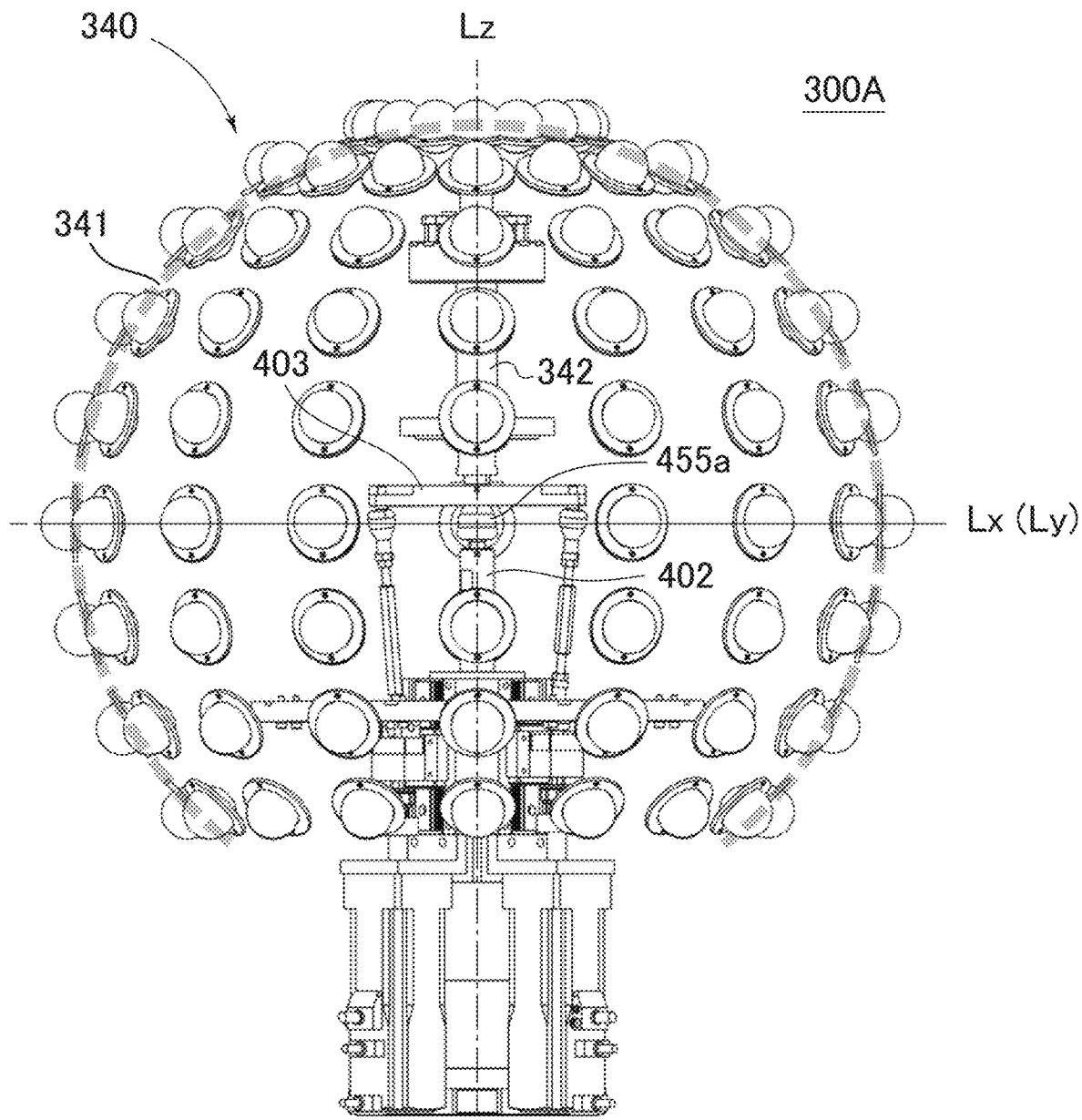
FIG. 13 is a diagram illustrating a positional relationship between the frame part and a swivel center.
Figure 14A:
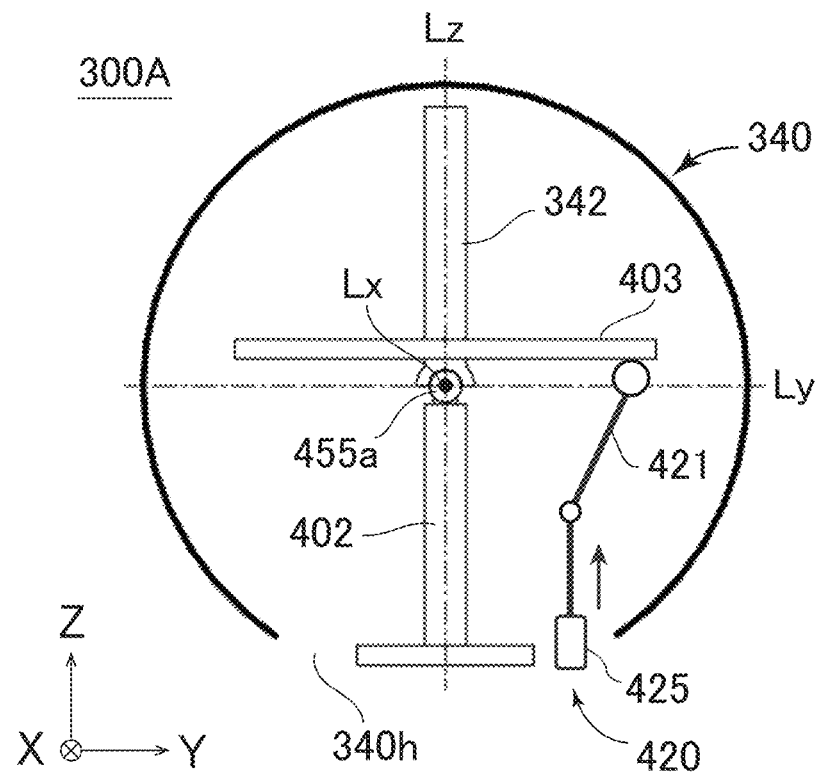
FIGS. 14A and 14B each schematically illustrate swinging of the supporting member and the frame part supported by the supporting member.
Figure 14B:
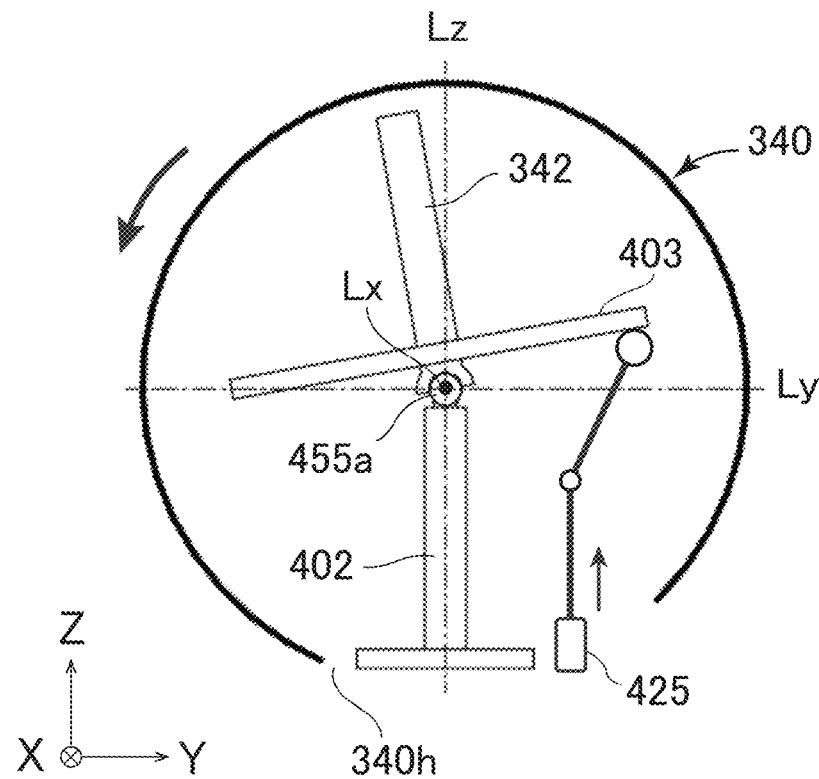

FIG. 12 is an enlarged view of a structure that swingably supports the frame part 340 in the mechanism part. FIG. 13 is a diagram illustrating a positional relationship between the frame part 340 and a swivel center 455a. FIGS. 14A and 14B each schematically illustrate swinging of the support member 403 and the frame part 340 supported by the support member 403.

As shown in FIGS. 12 and 13, the support member 403 is coupled to the central pillar 402 via a ball joint 455 provided at an upper end of the central pillar 402 of the supporting body 401. By doing this, the support member 403 is provided to be reorientable with respect to the central pillar 402 within a range of motion of the ball joint 455. Specifically, the support member 403 is provided so that it can change its orientation about the swivel center 455a, which is the center of a ball of the ball joint 455.

As shown in FIGS. 12 and 13, a state in which the central pillar 402 of the mechanism part 400 and the columnar member 342 of the frame part 340 extend along the central axis Lz is an initial state of the calibration jig 300A. In this state, the plate-shaped support member 403 extends in a plane orthogonal to the central axis Lz. The central axis Lx (FIG. 11) and the central axis Ly pass through the swivel center 455a and are orthogonal to each other.

As shown in FIG. 13, the frame part 340 is disposed such that the center of the sphere of the frame member 341 coincides with the swivel center 455a. Since the swivel center 455a and the center of the sphere of the frame member 341 are located at the same position as described above, the sphere of the frame member 341 rotates about its center as a rotation center when the support member 403 is swung. Such a configuration does not require a complicated calculation for the calibration based on the captured images of the plurality of elements to be measured 31.

(Operations of the Calibration Jig 300A)

As illustrated in FIG. 14A, the second movable part 421 is moved from the initial state of the calibration jig 300A by operating the second linear actuator 425 of the second swinging mechanism 420, for example.

Then, as shown in FIG. 14B, the support member 403 is pushed upward by the second movable part 421, whereby the support member 403 swings together with the frame part 340 on the support member 403. Specifically, the frame part 340 swings about the central axis Lx by a predetermined angle. In a case where the second movable part 421 is retracted in a direction opposite to the advancing direction from the state of FIG. 14A, the frame part 340 swings in the opposite direction compared to the description above.

Although not shown in FIGS. 14A and 14B, when the first movable part 411 is moved by operating the first linear actuator 415 of the first swinging mechanism 410, the frame part 340 swings about the central axis Ly by a predetermined angle.

In a case where the frame part 340 is to be rotated about the central axis Lz, the rotation mechanism 405 may be operated in a manner described above. The frame part 340 is rotatable in either a clockwise direction or a counterclockwise direction.

In the calibration jig 300A, as described above, the frame part 340 can be moved in a desired direction by appropriately operating each of the rotation mechanism 405, the first swinging mechanism 410, and the second swinging mechanism 420 independently.

(Effects of the Calibration Jig 300A)

According to the calibration jig 300A described above, the mechanism part 400 including the rotation mechanism 405 that rotates the frame part 340 about the central axis Lz, the first swinging mechanism 410 that swings the frame part 340 about the central axis Ly, and the second swinging mechanism 420 that swings the frame part 340 about the central axis Lx is provided. Therefore, the element to be measured 331 can be moved in the desired direction by operating each mechanism.

In particular, since the operations of the rotation mechanism 405, the first swing mechanism 410, and the second swing mechanism 420 correspond to the yaw component, pitch component, and roll component, respectively, controlling these mechanisms is easy. In order to swing the frame part 340 about the central axis Lx or the central axis Ly, a configuration is conceivable where the frame part 340 is moved about a predetermined axis by simultaneously operating the first swing mechanism 410 and the second swing mechanism 420, for example. However, in this case, since synchronous control of the two mechanisms is required, controlling them becomes complicated. In addition, since the trajectory along which the support member 403 moves becomes complicated, there is a concern that the positioning accuracy of the plurality of elements to be measured 331 may decrease. In contrast, in the calibration jig 300A, the frame part 340 can be swung by the independent operation of the first swinging mechanism 410 or the second swinging mechanism 420. Therefore, complicated control is not required, and the positional accuracy of the frame part 340 can be improved.

In the calibration jig 300A, the first swing mechanism 410 and the second swing mechanism 420 each operate the moving part using a linear actuator. In order to swing the frame part 340 about the central axis Lx or the central axis Ly, a configuration is conceivable where a rotation mechanism such as the rotation mechanism 405 is used, for example. However, according to the configuration using the linear actuator, such as in the calibration jig 300A, there is no need to dispose various mechanisms near the swivel center 455a, compared to the rotation mechanism. Therefore, the mechanism near the swivel center 455a can be miniaturized. Such a configuration is particularly advantageous in the configuration in which a part of the mechanism part 400 is disposed inside the frame part 340 as shown in FIG. 11.

In the calibration jig 300A, as shown in FIG. 11, the central part of the ball joint 413a and the central part of the ball joint 423b are located in the same plane. Further, the swivel center 455a is located in this plane. According to such a configuration, the support member 403 and the frame part 340 supported by the support member 403 can be properly moved about the swivel center 455a in accordance with the operations of the first swing mechanism 410 and the second swing mechanism 420.

Modified Example

Although the specific structure of the calibration jig 300A has been described above, the calibration jig 300A is not necessarily limited to the above structure. For example, when the size of the frame part 340 is sufficiently large, not only a part of the mechanism part 400 but also the entire mechanism part 400 may be disposed inside the frame part 340.

As described above, since the shape of the frame part 340 is not limited to a sphere, a part or all of the mechanism part 400 may be disposed inside the ellipsoid-shaped frame part 340, for example.

The mechanism part 400 may further include the XY stage at a lower portion thereof, and may have a configuration in which the frame part 340 can be moved to any position within the XY plane by operating the XY stage.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A calibration jig that calibrates a measurement apparatus for measuring a three-dimensional geometry of a measurement target, the calibration jig comprising:
    a plurality of elements to be measured;
    a frame part to which the plurality of elements to be measured are attached; and
    a mechanism part that moves the frame part, wherein the mechanism part includes:
        a rotation mechanism that rotates the frame part about a first axis;
        a first swinging mechanism that swings the frame part about a second axis orthogonal to the first axis; and
        a second swinging mechanism that swings the frame part about a third axis orthogonal to the first axis and the second axis,
    the mechanism part includes a support member that supports the frame part,
    the first swing mechanism includes:
        a first movable part coupled to the support member; and
        a first linear actuator that moves the first movable part, and the first swing mechanism is configured such that the support member swings about the second axis by causing the first linear actuator to move the first movable part, the second swing mechanism includes:
   a second movable part coupled to the support member; and
   a second linear actuator that moves the second movable part, the second swing mechanism is configured such that the support member swings about the third axis by causing the second linear actuator to move the second movable part, and a connecting part between the first movable part and the support member and a connecting part between the second movable part and the support member are ball joints, central parts of the plurality of ball joints are located in a plane orthogonal to the first axis, and a swivel center of the support member is located in the plane.

2. The calibration jig according to claim 1, wherein
the first movable part includes a first coupling arm,
one end of the first coupling arm is provided with the ball joint, and the other end of the first coupling arm is coupled to the first linear actuator, and
the first coupling arm and the first linear actuator are coupled by a knuckle joint that rotatably supports the first coupling arm about one axis.

3. The calibration jig according to claim 2, wherein
the second movable part includes a second coupling arm,
one end of the second coupling arm is provided with the ball joint, and the other end of the second coupling arm is coupled to the second linear actuator, and
the second coupling arm and the second linear actuator are coupled by a knuckle joint that rotatably supports the second coupling arm about one axis.

4. The calibration jig according to claim 1, wherein
the rotation mechanism includes a driving source that generates a driving force for rotating the frame part,
the first linear actuator and the second linear actuator are disposed at a first position in a direction along the first axis, and the drive source of the rotation mechanism is disposed at a second position, which is closer to the support member than the first position in the direction along the first axis.

5. A calibration jig that calibrates a measurement apparatus for measuring a three-dimensional geometry of a measurement target, the calibration jig comprising:
   a plurality of elements to be measured;
   a frame part to which the plurality of elements to be measured are attached; and
   a mechanism part that moves the frame part, wherein
the mechanism part includes:
   a rotation mechanism that rotates the frame part about a first axis;
   a first swinging mechanism that swings the frame part about a second axis orthogonal to the first axis; and
   a second swinging mechanism that swings the frame part about a third axis orthogonal to the first axis and the second axis,
the frame part has a shape of a sphere or an ellipsoid, on whose surface the plurality of elements to be measured are provided, and
at least a part of the mechanism part is provided so as to be located inside the sphere or ellipsoid of the frame part.

6. The calibration jig according to claim 2, wherein
the frame part is provided such that a center of the sphere or ellipsoid is located at a swivel center which is an intersection point of the second axis and the third axis.

7. The calibration jig according to claim 2, wherein
the mechanism part has a shape where, when viewed by projecting the mechanism part and the frame part in a direction of the first axis, the mechanism part is located entirely inside an outer shape of the frame part.

8. The calibration jig according to claim 1, wherein
the element to be measured includes:
   a main body part that has a predetermined shape; and
   a label part provided on the main body part or a member attached to the main body part, wherein an identification code for identifying the element to be measured is shown.

\* \* \* \* \*